(12) United States Patent
Yu et al.

(10) Patent No.: US 11,875,487 B2
(45) Date of Patent: Jan. 16, 2024

(54) HIGH DYNAMIC RANGE IMAGE PROCESSING METHOD AND APPARATUS

(71) Applicant: HUAWEI TECHNOLOGIES CO., LTD., Shenzhen (CN)

(72) Inventors: Quanhe Yu, Beijing (CN); Haitao Yang, Shenzhen (CN); Jiantong Zhou, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 97 days.

(21) Appl. No.: 17/720,534

(22) Filed: Apr. 14, 2022

(65) Prior Publication Data

US 2022/0245774 A1 Aug. 4, 2022

Related U.S. Application Data

(63) Continuation of application No. PCT/CN2020/107428, filed on Aug. 6, 2020.

(30) Foreign Application Priority Data

Oct. 18, 2019 (CN) .......................... 201910995765.6

(51) Int. Cl.
*G06T 7/90* (2017.01)
*G09G 5/10* (2006.01)
*G06T 5/00* (2006.01)

(52) U.S. Cl.
CPC ................ *G06T 5/009* (2013.01); *G06T 7/90* (2017.01); *G09G 5/10* (2013.01);
(Continued)

(58) Field of Classification Search
CPC . G06T 5/009; G06T 7/90; G06T 2207/10024; G06T 2207/20208;
(Continued)

(56) References Cited

U.S. PATENT DOCUMENTS

2011/0211732 A1 9/2011 Rapaport
2019/0019277 A1 1/2019 Chen et al.

FOREIGN PATENT DOCUMENTS

CN 107211079 A 9/2017
CN 108431886 A 8/2018
(Continued)

*Primary Examiner* — Jitesh Patel
(74) *Attorney, Agent, or Firm* — Maier & Maier, PLLC

(57) ABSTRACT

A high dynamic range image processing method and apparatus, to improve a display effect of a high dynamic range image. The method includes: obtaining image information of a to-be-processed high dynamic range (HDR) image, the image information includes a maximum RGB component value of a first pixel corresponding to a first percentage and a maximum RGB component value of a second pixel corresponding to a second percentage; determining a maximum reference value of the HDR image; determining a maximum luminance modification value of the HDR image based on the maximum reference value and a plurality of preset hierarchy intervals, where the maximum luminance modification value is used to modify a largest value in maximum RGB component values of the plurality of pixels included in the HDR image; and adjusting a dynamic range of the HDR image based on the maximum luminance modification value.

20 Claims, 7 Drawing Sheets

(52) U.S. Cl.
CPC ............... *G06T 2207/10024* (2013.01); *G06T 2207/20208* (2013.01); *G09G 2320/0233* (2013.01)

(58) Field of Classification Search
CPC . G06T 5/007; G06T 5/00; G09G 5/10; G09G 2320/0233; G09G 2360/16; H04N 19/186; H04N 19/85; H04N 19/30; H04N 19/70
See application file for complete search history.

(56) References Cited

FOREIGN PATENT DOCUMENTS

| | | | |
|---|---|---|---|
| CN | 108694030 | A | 10/2018 |
| CN | 108781290 | A | 11/2018 |
| CN | 109219961 | A | 1/2019 |
| EP | 2993886 | A1 | 3/2016 |
| EP | 3131284 | A1 | 2/2017 |
| WO | 2015180854 | A1 | 12/2015 |

HIGH DYNAMIC RANGE IMAGE PROCESSING METHOD AND APPARATUS

CROSS-REFERENCE TO RELATED APPLICATIONS

This application is a continuation of International Application No. PCT/CN2020/107428, filed on Aug. 6, 2020, which claims priority to Chinese Patent Application No. 201910995765.6, filed on Oct. 18, 2019. The disclosures of the aforementioned applications are hereby incorporated by reference in their entireties.

TECHNICAL FIELD

The embodiments relate to the image processing field, and a high dynamic range image processing method and apparatus.

BACKGROUND

A dynamic range (DR) is used to indicate a ratio of a maximum value to a minimum value of a variable in many fields. For a digital image, a dynamic range indicates a ratio of maximum luminance to minimum luminance in a displayable range of the image, that is, a quantity of grayscale levels obtained through division between the "brightest" area and the "darkest" area of the image. A unit of luminance is Candela per square meter ($cd/m^2$) or may be represented as a nit. A larger dynamic range of an image indicates richer light levels for the image and a more realistic visual effect of the image. A dynamic range of a natural scene in the real world is from $10^{-3}$ to 106. The dynamic range is very large and therefore is referred to as a high dynamic range (HDR). Compared with a high dynamic range image, a common image has a low dynamic range (LDR).

Currently, a display device featuring a dynamic range less than 0.1 nit to 400 nits is usually referred to as a standard dynamic range (SDR) display device, and a display device featuring a dynamic range greater than 0.01 nit to 540 nits is referred to as a high dynamic range (HDR) display device. Different high dynamic range display devices feature different dynamic ranges, for example, a high dynamic range display device featuring a dynamic range of 0.01 nit to 540 nits and a high dynamic range display device featuring a dynamic range of 0.005 nit to 1000 nits. A dynamic range of an HDR image needs to be adjusted (decreased or increased), to adjust a high dynamic range of the HDR image to a displayable range of a display device for display, so that the HDR image can be adjusted and displayed by HDR display devices supporting different dynamic ranges.

In the conventional technology, adjustment of a dynamic range of an HDR image is related only to parameters such as a maximum content light level and a minimum content light level of the image, and maximum luminance and minimum luminance of a display device. Using only these parameters may cause a loss of a large quantity of light levels of the HDR image. Consequently, a brightness contrast is not significant, and a display effect of an adjusted HDR image on the display device is poor.

SUMMARY

Embodiments provide an HDR image processing method and apparatus, to improve a display effect of an HDR image.

According to a first aspect, an embodiment provides a high dynamic range image processing method. The method includes:

obtaining image information of a to-be-processed HDR image, where the HDR image includes a plurality of pixels, the image information includes a first percentage, a maximum RGB component value of a first pixel corresponding to the first percentage, a second percentage, and a maximum RGB component value of a second pixel corresponding to the second percentage, the first percentage indicates a percentage of at least one pixel with a maximum RGB component value less than or equal to the maximum RGB component value of the first pixel in the plurality of pixels to the plurality of pixels, the second percentage indicates a percentage of at least one pixel with a maximum RGB component value less than or equal to the maximum RGB component value of the second pixel in the plurality of pixels to the plurality of pixels, the maximum RGB component value indicates a largest value in an R component value, a G component value, and a B component value of a pixel, and both the first percentage and the second percentage are greater than 0 and less than 1;

determining a maximum reference value of the HDR image based on the first percentage, the maximum RGB component value of the first pixel corresponding to the first percentage, the second percentage, and the maximum RGB component value of the second pixel corresponding to the second percentage;

determining a maximum modification value of the HDR image based on the maximum reference value and a plurality of preset hierarchy intervals, where the hierarchy interval is used to classify the maximum reference value, each of the plurality of hierarchy intervals corresponds to one value range corresponding to the maximum reference value, and the maximum modification value is used to modify a largest value in maximum RGB component values of the plurality of pixels included in the HDR image; and adjusting a dynamic range of the HDR image based on the maximum modification value of the HDR image.

According to the HDR image processing method provided in this embodiment, the maximum RGB component value of the first pixel and the maximum RGB component value of the second pixel are not a maximum content light level or a minimum content light level of the HDR image, the maximum reference value obtained based on the pixels are classified, and the maximum modification value of the HDR image is calculated based on the maximum reference value. In this way, classification accuracy for HDR images with different levels of dynamic ranges can be improved. In addition, when the maximum modification value is used to adjust the dynamic range of the HDR image, a display effect of the HDR image can be improved.

Optionally, the method may be performed by an image processing apparatus.

Optionally, the first percentage may be a first proportion, and the second percentage may be a second proportion.

In an optional embodiment, for example, the HDR image includes four pixels, a maximum RGB component value of a first pixel is 80, a maximum RGB component value of a second pixel is 30, a maximum RGB component value of a third pixel is 60, and a maximum RGB component value of a fourth pixel is 55. In this case, 25% corresponds to the second pixel, 50% corresponds to the fourth pixel, 75% corresponds to the third pixel, and 100% corresponds to the first pixel.

In the four pixels, a pixel (the second pixel) with a maximum RGB component value less than or equal to 30 accounts for 25% of the four pixels, pixels (the second pixel and the fourth pixel) with maximum RGB component values less than or equal to 55 account for 50% of the four pixels, pixels (the second pixel, the fourth pixel, and the third pixel) with maximum RGB component values less than or equal to 60 account for 75% of the four pixels, and pixels (the second pixel, the fourth pixel, the third pixel, and the first pixel) with maximum RGB component values less than or equal to 80 account for 100% of the four pixels.

It should be noted that the plurality of pixels included in the HDR image may be understood as a plurality of pixels included in an active display area of the HDR image, and the active display area may be some or all areas of the HDR image.

For example, the active display area of the HDR image may be a rectangular area jointly determined based on a horizontal display size and a vertical display size.

Optionally, the image processing apparatus may obtain the image information of the HDR image in a plurality of manners. This is not limited in this embodiment.

In a possible implementation, the image processing apparatus may calculate the image information of the HDR image by using an existing method, to obtain the image information.

In another possible implementation, the image processing apparatus may obtain the image information based on metadata carried in the HDR image.

Optionally, the image processing apparatus may determine the maximum reference value of the HDR image based on the first percentage, the maximum RGB component value of the first pixel corresponding to the first percentage, the second percentage, and the maximum RGB component value of the second pixel corresponding to the second percentage in a plurality of manners. This is not limited in this embodiment.

In a possible implementation, the image information further includes an average value of the maximum RGB component values of the plurality of pixels, and the determining a maximum reference value of the HDR image based on the first percentage, the maximum RGB component value of the first pixel corresponding to the first percentage, the second percentage, and the maximum RGB component value of the second pixel corresponding to the second percentage includes: determining the maximum reference value based on the first percentage, the maximum RGB component value of the first pixel, the second percentage, the maximum RGB component value of the second pixel, the largest value in the maximum RGB component values of the plurality of pixels, and the average value of the maximum RGB component values of the plurality of pixels.

In a possible implementation, the maximum reference value MAX may be determined according to the following formula:

$$MAX = B \times \text{maximum\_maxrgb} + A \times (2 \times \text{average\_maxrgb}) + (1 - A - B) \times (P_{K_1} - P_{K_2}),$$

where $$A = (1-B) \times \left(1 - F\left(\frac{\text{average\_maxrgb}}{\text{maximum\_maxrgb}}\right)\right),$$

maximum_maxrgb represents the largest value in the maximum RGB component values of the plurality of pixels, average_maxrgb represents the average value of the maximum RGB component values of the plurality of pixels, $K_1$ represents the first percentage, $P_{K_1}$ represents the maximum RGB component value of the first pixel, $K_2$ represents the second percentage, $P_{K_2}$ represents the maximum RGB component value of the second pixel, $F(\ )$ represents a preset function, B, $K_1$, and $K_2$ are preset values, $0<B<1$, $K_1-K_2 \geq 0.5$, $0<K_1<1$, and $0<K_2<1$.

Optionally, the $F(\ )$ function may be a constant function or an increasing function. This is not limited in this embodiment.

For example, $F(x)=x$, $F(x)=x^N$, $F(x)=\log x$, or $F(x)=ax+b$, where a and b are constants.

According to the HDR image processing method provided in this embodiment, maximum_maxrgb indicates a largest value in the maximum RGB component values of the pixels corresponding to 100%, 2×average_maxrgb indicates 2 times of an average value of the maximum RGB component values of the pixels corresponding to 100%, and $K_1-K_2 \geq 0.5$ indicates maximum RGB component values of pixels corresponding to a percentage greater than 50%; different weights are set for the three dimensions to obtain a final maximum reference value, and the largest value in the maximum RGB component values of the HDR image is finally adjusted based on the maximum reference value. This can avoid a case in the conventional technology in which an adjusted image is excessively dark after the image has been adjusted based on maximum luminance.

In a possible implementation, the maximum reference value MAX may be determined according to the following formula:

$$MAX = A \times P_{K_1} + (1-A) \times P_{K_2},$$

where $K_1$ represents the first percentage, $P_{K_1}$ represents the maximum RGB component value of the first pixel, $K_2$ represents the second percentage, $P_{K_2}$ represents the maximum RGB component value of the second pixel, A, $K_1$, and $K_2$ are preset values, $0<A<1$, $0<K_1<1$, and $0<K_2<1$.

According to the HDR image processing method provided in this embodiment, $P_{K_1}$ and $P_{K_2}$ are maximum RGB component values of two pixels of the HDR image other than a maximum content light level and a minimum content light level of the HDR image, a maximum reference value is calculated based on the two pixels, and a largest value in maximum RGB component values of the HDR image is finally adjusted based on the maximum reference value. This can avoid a case in the conventional technology in which an adjusted image is excessively dark after the image has been adjusted based on maximum luminance.

In a possible implementation, each hierarchy interval corresponds to one expression, the expression is used to calculate the maximum modification value of the HDR image, and the determining a maximum modification value of the HDR image based on the maximum reference value and a plurality of preset hierarchy intervals includes: determining, from the plurality of hierarchy intervals, a first hierarchy interval to which the maximum reference value belongs, where the first hierarchy interval corresponds to a first expression; and determining the maximum modification value according to the first expression.

In a possible implementation, the maximum modification value maximum_maxrgb1 of the HDR image may be determined according to the following formula:

$$\text{maximum\_maxrgb1} = \begin{cases} MaxRefDisplay, & \text{MAX} > MaxRefDisplay \\ \text{MAX}, & \text{MIN} \le \text{MAX} \le MaxRefDisplay \\ \text{MIN}, & \text{MAX} < \text{MIN} \end{cases},$$

where

MaxRefDisplay represents maximum display luminance of a display device used to display the to-be-processed HDR image, MIN represents a preset hierarchy threshold, and MAX represents the maximum reference value.

In a possible implementation, the maximum modification value maximum_maxrgb1 of the HDR image may be determined according to the following formula:

$$\text{maximum\_maxrgb1} = \begin{cases} \min(\text{maximum\_maxrgb}, f(\text{MAX})), & \text{MAX} > A \\ A, & \text{MAX} \le A \end{cases},$$

where maximum_maxrgb represents the largest value in the maximum RGB component values of the plurality of pixels, MAX represents the maximum reference value, A represents a preset hierarchy threshold, min( ) represents an operation of obtaining a minimum value, and f( ) represents a non-linear function or a linear function.

In a possible implementation, the method further includes: verifying accuracy of the maximum modification value based on a third percentage, a maximum RGB component value of a third pixel corresponding to the third percentage in the HDR image, a maximum RGB component value of a fourth pixel corresponding to the third percentage in a processed image, a fourth percentage, a maximum RGB component value of a fifth pixel corresponding to the fourth percentage in the HDR image, and a maximum RGB component value of a sixth pixel corresponding to the fourth percentage in the processed HDR image, where the processed image is an image obtained by adjusting the dynamic range of the HDR image.

It should be noted that the accuracy of the maximum modification value may alternatively be understood as classification accuracy for the HDR image.

In a possible implementation, the verifying accuracy of the maximum modification value based on a third percentage, a maximum RGB component value of a third pixel corresponding to the third percentage in the HDR image, a maximum RGB component value of a fourth pixel corresponding to the third percentage in an output image, a fourth percentage, a maximum RGB component value of a fifth pixel corresponding to the fourth percentage in the HDR image, and a maximum RGB component value of a sixth pixel corresponding to the fourth percentage in the output HDR image includes:

when $P_{K_3} \ne P_{K_4}$ and $P'_{K_3} - P'_{K_4} > T$, determining that the maximum modification value is accurate, where $K_3 - K_4 < M$, M is a preset first threshold, T is a preset second threshold, $0 < T < 2$, $K_3$ represents the third percentage, $P_{K_3}$ represents the maximum RGB component value of the third pixel, $P_{K_3}$ represents the maximum RGB component value of the fourth pixel, $K_4$ represents the fourth percentage, $P_{K_4}$ represents the maximum RGB component value of the fifth pixel, and $P'_{K_4}$ represents the maximum RGB component value of the sixth pixel.

According to a second aspect, an embodiment further provides an image processing method. The method includes:

obtaining image information of a to-be-processed image, where the to-be-processed image includes a plurality of pixels, the image information includes a first ratio, a first maximum RGB component value, a second ratio, and a second maximum RGB component value, the first ratio indicates a ratio of a quantity of pixels with maximum RGB component values less than or equal to the first maximum RGB component value in the plurality of pixels to a quantity of the plurality of pixels, the second ratio indicates a ratio of a quantity of pixels with maximum RGB component values less than or equal to the second maximum RGB component value in the plurality of pixels to the quantity of the plurality of pixels, and the maximum RGB component value indicates a largest component value in an R component value, a G component value, and a B component value of a pixel;

determining a maximum reference value of the to-be-processed image based on the first ratio, the first maximum RGB component value, the second ratio, and the second maximum RGB component value;

adjusting a largest value in maximum RGB component values of the plurality of pixels based on the maximum reference value and a plurality of preset hierarchy intervals, to determine a maximum modification value of the to-be-processed image, where each of the plurality of hierarchy intervals corresponds to one value range corresponding to the maximum reference value; and adjusting a dynamic range of the to-be-processed image based on the maximum modification value of the to-be-processed image.

In a possible implementation, the image information further includes an average value of the maximum RGB component values of the plurality of pixels, and the determining a maximum reference value of the to-be-processed image based on the first ratio, the first maximum RGB component value, the second ratio, and the second maximum RGB component value includes: determining the maximum reference value based on the first ratio, the first maximum RGB component value, the second ratio, the second maximum RGB component value, the largest value in the maximum RGB component values of the plurality of pixels, and the average value of the maximum RGB component values of the plurality of pixels.

In a possible implementation, the maximum reference value MAX is determined according to the following formula:

$$\text{MAX} = B \times \text{maximum\_maxrgb} + A \times (2 \times \text{average\_maxrgb}) + (1 - A - B) \times (P_{K_1} - P_{K_2}),$$

where $$A = (1 - B) \times \left(1 - F\left(\frac{\text{average\_maxrgb}}{\text{maximum\_maxrgb}}\right)\right),$$

maximum_maxrgb represents the largest value in the maximum RGB component values of the plurality of pixels, average_maxrgb represents the average value of the maximum RGB component values of the plurality of pixels, $K_1$ represents the first ratio, $P_K$ represents the first maximum RGB component value, $K_2$ represents the second ratio, $P_{K_2}$ represents the second maximum RGB component value, F( ) represents a preset function, B, $K_1$, and $K_2$ are preset values, $0<B<1$, $K_1-K_2\geq 0.5$, $0<K_1<1$, and $0<K_2<1$.

In a possible implementation, the maximum reference value MAX is determined according to the following formula:

$$MAX = A \times P_{K_1} + (1-A) \times P_{K_2},$$

where $K_1$ represents the first ratio, $P_{K_1}$ represents the first maximum RGB component value, $K_2$ represents the second ratio, $P_{K_2}$ represents the second maximum RGB component value, A, $K_1$, and $K_2$ are preset values, $0<A<1$, $0<K_1<1$, and $0<K_2<1$.

In a possible implementation, each hierarchy interval corresponds to one expression, the expression is used to calculate the maximum modification value of the to-be-processed image, and the maximum modification value maximum_maxrgb1 of the to-be-processed image is determined according to the following formula:

$$\text{maximum\_maxrgb1} = \begin{cases} MaxRefDisplay, & MAX > MaxRefDisplay \\ MAX, & MIN \leq MAX \leq MaxRefDisplay \\ MIN, & MAX < MIN \end{cases},$$

where

MaxRefDisplay represents maximum display luminance of a display device used to display the to-be-processed image, MIN represents a preset hierarchy threshold, and MAX represents the maximum reference value.

In a possible implementation, the method further includes: verifying accuracy of the maximum modification value based on a third ratio, a third maximum RGB component value, a fourth maximum RGB component value, a fourth ratio, a fifth maximum RGB component value, and a sixth maximum RGB component value, where the third ratio indicates a ratio of a quantity of pixels with maximum RGB component values less than or equal to the third maximum RGB component value in the plurality of pixels to the quantity of the plurality of pixels, the fourth maximum RGB component value satisfies the following case that a ratio of a quantity of pixels with maximum RGB component values less than or equal to the fourth maximum RGB component value in pixels of a processed image to a quantity of the pixels of the processed image is the third ratio, the fourth ratio indicates a ratio of a quantity of pixels with maximum RGB component values less than or equal to the fifth maximum RGB component value in the plurality of pixels to the quantity of the plurality of pixels, the sixth maximum RGB component value satisfies the following case that a ratio of a quantity of pixels with maximum RGB component values less than or equal to the sixth maximum RGB component value in the pixels of the processed image to the quantity of the pixels of the processed image is the fourth ratio, and the processed image is an image obtained by adjusting the dynamic range of the to-be-processed image.

In a possible implementation, the verifying accuracy of the maximum modification value based on a third ratio, a third maximum RGB component value, a fourth maximum RGB component value, a fourth ratio, a fifth maximum RGB component value, and a sixth maximum RGB component value includes:

when $P_{K_3} \neq P_{K_4}$ and $P'_{K_3} - P'_{K_4} > T$, determining that the maximum modification value is accurate, where $K_3 - K_4 < M$, M is a preset first threshold, T is a preset second threshold, $0<T<2$, $K_3$ represents the third ratio, $P_{K_3}$ represents the third maximum RGB component value, $P'_{K_3}$ represents the fourth maximum RGB component value, $K_4$ represents the fourth ratio, $P_{K_4}$ represents the fifth maximum RGB component value, and $P'_{K_4}$ represents the sixth maximum RGB component value.

In a possible implementation, the method further includes at least one of the following steps:

determining the first maximum RGB component value based on the first ratio and the plurality of pixels;

determining the second maximum RGB component value based on the second ratio and the plurality of pixels;

determining the third maximum RGB component value based on the third ratio and the plurality of pixels;

determining the fourth maximum RGB component value based on the third ratio and the pixels of the processed image;

determining the fifth maximum RGB component value based on the fourth ratio and the plurality of pixels; or determining the sixth maximum RGB component value based on the fourth ratio and the pixels of the processed image.

According to a third aspect, an embodiment further provides a high dynamic range image processing apparatus. The apparatus includes:

an obtaining unit, configured to obtain image information of a to-be-processed HDR image, where the HDR image includes a plurality of pixels, the image information includes a first percentage, a maximum RGB component value of a first pixel corresponding to the first percentage, a second percentage, and a maximum RGB component value of a second pixel corresponding to the second percentage, the first percentage indicates a percentage of at least one pixel with a maximum RGB component value less than or equal to the maximum RGB component value of the first pixel in the plurality of pixels to the plurality of pixels, the second percentage indicates a percentage of at least one pixel with a maximum RGB component value less than or equal to the maximum RGB component value of the second pixel in the plurality of pixels to the plurality of pixels, the maximum RGB component value indicates a largest value in an R component value, a G component value, and a B component value of a pixel, and both the first percentage and the second percentage are greater than 0 and less than 1;

a determining unit, configured to: determine a maximum reference value of the HDR image based on the first percentage, the maximum RGB component value of the first pixel corresponding to the first percentage, the second percentage, and the maximum RGB component value of the second pixel corresponding to the second percentage; and determine a maximum modification value of the HDR image based on the maximum reference value and a plurality of preset hierarchy intervals, where the hierarchy interval is used to classify the maximum reference value, each of the plurality of hierarchy intervals corresponds to one value range corresponding to the maximum reference value, and the maximum modification value is used to modify a largest value in maximum RGB component values of the plurality of pixels included in the HDR image; and an adjustment unit, configured to adjust a dynamic range of the HDR image based on the maximum modification value of the HDR image.

In a possible implementation, the image information further includes an average value of the maximum RGB component values of the plurality of pixels, and the determining unit is configured to determine the maximum reference value based on the first percentage, the maximum RGB component value of the first pixel, the second percentage, the maximum RGB component value of the second pixel, the largest value in the maximum RGB component values of the plurality of pixels, and the average value of the maximum RGB component values of the plurality of pixels.

In a possible implementation, the determining unit is configured to determine the maximum reference value MAX according to the following formula:

$$MAX = B \times \text{maximum\_maxrgb} + \\ A \times (2 \times \text{average\_maxrgb}) + (1 - A - B) \times (P_{K_1} - P_{K_2}),$$

where $$A = (1 - B) \times \left(1 - F\left(\frac{\text{average\_maxrgb}}{\text{maximum\_maxrgb}}\right)\right),$$

maximum_maxrgb represents the largest value in the maximum RGB component values of the plurality of pixels, average_maxrgb represents the average value of the maximum RGB component values of the plurality of pixels, $K_1$ represents the first percentage, $P_{K_1}$ represents the maximum RGB component value of the first pixel, $K_2$ represents the second percentage, $P_{K_2}$ represents the maximum RGB component value of the second pixel, F( ) represents a preset function, B, $K_1$, and $K_2$ are preset values, $0<B<1$, $K_1-K_2 \geq 0.5$, $0<K_1<1$, and $0<K_2<1$.

In a possible implementation, the determining unit is configured to determine the maximum reference value MAX according to the following formula:

$$MAX = A \times P_{K_1} + (1 - A) \times P_{K_2},$$

where $K_1$ represents the first percentage, $P_{K_1}$ represents the maximum RGB component value of the first pixel, $K_2$ represents the second percentage, $P_{K_2}$ represents the maximum RGB component value of the second pixel, A, $K_1$, and $K_2$ are preset values, $0<A<1$, $0<K_1<1$, and $0<K_2<1$.

In a possible implementation, each hierarchy interval corresponds to one expression, the expression is used to calculate the maximum modification value of the HDR image, and the determining unit is configured to: determine, from the plurality of hierarchy intervals, a first hierarchy interval to which the maximum reference value belongs, where the first hierarchy interval corresponds to a first expression; and determine the maximum modification value according to the first expression.

In a possible implementation, the determining unit is configured to determine the maximum modification value maximum_maxrgb1 of the HDR image according to the following formula:

$$\text{maximum\_maxrgb1} = \begin{cases} \textit{MaxRefDisplay}, & MAX > \textit{MaxRefDisplay} \\ MAX, & MIN \leq MAX \leq \textit{MaxRefDisplay} \\ MIN, & MAX < MIN \end{cases},$$

where

MaxRefDisplay represents maximum display luminance of a display device used to display the to-be-processed HDR image, MIN represents a preset hierarchy threshold, and MAX represents the maximum reference value.

In a possible implementation, the apparatus further includes a verification unit, and the verification unit is configured to verify accuracy of the maximum modification value based on a third percentage, a maximum RGB component value of a third pixel corresponding to the third percentage in the HDR image, a maximum RGB component value of a fourth pixel corresponding to the third percentage in an output image, a fourth percentage, a maximum RGB component value of a fifth pixel corresponding to the fourth percentage in the HDR image, and a maximum RGB component value of a sixth pixel corresponding to the fourth percentage in the output HDR image, where the output image is an image obtained by adjusting the dynamic range of the HDR image.

In a possible implementation, the verification unit is configured to:

when $P_{K_3} \neq P_{K_4}$ and $P'_{K_3} - P'_{K_4} > T$, determine that the maximum modification value is accurate, where $K_3 - K_4 < M$, M is a preset first threshold, T is a preset second threshold, $0<T<2$, $K_3$ represents the third percentage, $P_{K_3}$ represents the maximum RGB component value of the third pixel, $P'_{K_3}$ represents the maximum RGB component value of the fourth pixel, $K_4$ represents the fourth percentage, $P_{K_4}$ represents the maximum RGB component value of the fifth pixel, and $P'_{K_4}$ represents the maximum RGB component value of the sixth pixel.

According to a fourth aspect, an embodiment further provides an image processing apparatus. The apparatus includes:

an obtaining unit, configured to obtain image information of a to-be-processed image, where the to-be-processed image includes a plurality of pixels, the image information includes a first ratio, a first maximum RGB component value, a second ratio, and a second maximum RGB component value, the first ratio indicates a ratio of a quantity of pixels with maximum RGB component values less than or equal to the first maximum RGB component value in the plurality of pixels to a quantity of the plurality of pixels, the second ratio indicates a ratio of a quantity of pixels with maximum RGB component values less than or equal to the second maximum RGB component value in the plurality of pixels to the quantity of the plurality of pixels, and the maximum RGB component value indicates a largest component value in an R component value, a G component value, and a B component value of a pixel;

a determining unit, configured to: determine a maximum reference value of the to-be-processed image based on the first ratio, the first maximum RGB component value, the second ratio, and the second maximum RGB component value; and adjust a largest value in maximum RGB component values of the plurality of pixels based on the maximum reference value and a plurality of preset hierarchy intervals, to determine a maximum modification value of the to-be-processed image, where each of the plurality of hierarchy intervals corresponds to one value range corresponding to the maximum reference value; and an adjustment unit, configured to adjust a dynamic range of the to-be-processed image based on the maximum modification value of the to-be-processed image.

In a possible implementation, the image information further includes an average value of the maximum RGB component values of the plurality of pixels, and the determining unit is configured to determine the maximum reference value based on the first ratio, the first maximum RGB component value, the second ratio, the second maximum RGB component value, the largest value in the maximum RGB component values of the plurality of pixels, and the average value of the maximum RGB component values of the plurality of pixels.

In a possible implementation, the determining unit is configured to determine the maximum reference value MAX according to the following formula:

$$\text{MAX} = B \times \text{maximum\_maxrgb} + A \times (2 \times \text{average\_maxrgb}) + (1 - A - B) \times (P_{K_1} - P_{K_2}),$$

where $$A = (1-B) \times \left(1 - F\left(\frac{\text{average\_maxrgb}}{\text{maximum\_maxrgb}}\right)\right),$$

maximum_maxrgb represents the largest value in the maximum RGB component values of the plurality of pixels, average_maxrgb represents the average value of the maximum RGB component values of the plurality of pixels, $K_1$ represents the first ratio, $P_{K_1}$ represents the first maximum RGB component value, $K_2$ represents the second ratio, $P_{K_2}$ represents the second maximum RGB component value, F( ) represents a preset function, B, $K_1$, and $K_2$ are preset values, $0<B<1$, $K_1-K_2\geq 0.5$, $0<K_1<1$, and $0<K_2<1$.

In a possible implementation, the determining unit is configured to determine the maximum reference value MAX according to the following formula:

$$\text{MAX} = A \times P_{K_1} + (1-A) \times P_{K_2},$$

where $K_1$ represents the first ratio, $P_{K_1}$ represents the first maximum RGB component value, $K_2$ represents the second ratio, $P_{K_2}$ represents the second maximum RGB component value, A, $K_1$, and $K_2$ are preset values, $0<A<1$, $0<K_1<1$, and $0<K_2<1$.

In a possible implementation, each hierarchy interval corresponds to one expression, the expression is used to calculate the maximum modification value of the to-be-processed image, and the determining unit is configured to determine the maximum modification value maximum_maxrgb1 of the to-be-processed image according to the following formula:

$$\text{maximum\_maxrgb1} = \begin{cases} MaxRefDisplay, & \text{MAX} > MaxRefDisplay \\ \text{MAX}, & \text{MIN} \leq \text{MAX} \leq MaxRefDisplay \\ \text{MIN}, & \text{MAX} < \text{MIN} \end{cases},$$

where

MaxRefDisplay represents maximum display luminance of a display device used to display the to-be-processed image, MIN represents a preset hierarchy threshold, and MAX represents the maximum reference value.

In a possible implementation, the apparatus further includes a verification unit, and the verification unit is configured to: verify accuracy of the maximum modification value based on a third ratio, a third maximum RGB component value, a fourth maximum RGB component value, a fourth ratio, a fifth maximum RGB component value, and a sixth maximum RGB component value, where the third ratio indicates a ratio of a quantity of pixels with maximum RGB component values less than or equal to the third maximum RGB component value in the plurality of pixels to the quantity of the plurality of pixels, the fourth maximum RGB component value satisfies the following case that a ratio of a quantity of pixels with maximum RGB component values less than or equal to the fourth maximum RGB component value in pixels of a processed image to a quantity of the pixels of the processed image is the third ratio, the fourth ratio indicates a ratio of a quantity of pixels with maximum RGB component values less than or equal to the fifth maximum RGB component value in the plurality of pixels to the quantity of the plurality of pixels, the sixth maximum RGB component value satisfies the following case that a ratio of a quantity of pixels with maximum RGB component values less than or equal to the sixth maximum RGB component value in the pixels of the processed image to the quantity of the pixels of the processed image is the fourth ratio, and the processed image is an image obtained by adjusting the dynamic range of the to-be-processed image.

In a possible implementation, the verification unit is configured to:

when $P_{K_3} \neq P_{K_4}$ and $P'_{K_3} - P'_{K_4} > T$, determine that the maximum modification value is accurate, where $K_3 - K_4 < M$, M is a preset first threshold, T is a preset second threshold, $0<T<2$, $K_3$ represents the third ratio, $P_{K_3}$ represents the third maximum RGB component value, $P'_{K_3}$ represents the fourth maximum RGB component value, $K_4$ represents the fourth ratio, $P_{K_4}$ represents the fifth maximum RGB component value, and $P'_{K_4}$ represents the sixth maximum RGB component value.

In a possible implementation, the determining unit is further configured to perform at least one of the following steps:

determining the first maximum RGB component value based on the first ratio and the plurality of pixels;
determining the second maximum RGB component value based on the second ratio and the plurality of pixels;
determining the third maximum RGB component value based on the third ratio and the plurality of pixels;
determining the fourth maximum RGB component value based on the third ratio and the pixels of the processed image;
determining the fifth maximum RGB component value based on the fourth ratio and the plurality of pixels; or
determining the sixth maximum RGB component value based on the fourth ratio and the pixels of the processed image.

According to a fifth aspect, an embodiment further provides a high dynamic range image processing method. The method includes: obtaining image information of a to-be-processed HDR image, where the HDR image includes a plurality of pixels, the image information includes a maximum RGB component value of a first pixel corresponding to a first percentage and a maximum RGB component value of a second pixel corresponding to a second percentage, the first percentage indicates a percentage of at least one pixel with a maximum RGB component value less than or equal to the maximum RGB component value of the first pixel in the plurality of pixels to the plurality of pixels, the second percentage indicates a percentage of at least one pixel with a maximum RGB component value less than or equal to the maximum RGB component value of the second pixel in the plurality of pixels to the plurality of pixels, the maximum RGB component value indicates a largest value in an R component value, a G component value, and a B component value of a pixel, and both the first percentage and the second percentage are greater than 0 and less than 1; determining a maximum reference value of the HDR image based on the maximum RGB component value of the first pixel corresponding to the first percentage and the maximum RGB component value of the second pixel corresponding to the second percentage; determining a maximum luminance modification value of the HDR image based on the maximum reference value and a plurality of preset hierarchy intervals, where the hierarchy interval is used to classify the maximum reference value, each of the plurality of hierarchy intervals corresponds to one value range corresponding to the maximum reference value, and the maximum luminance modification value is used to modify a largest value in maximum RGB component values of the plurality of pixels included in the HDR image; and adjusting a dynamic range of the HDR image based on the maximum luminance modification value.

In a possible implementation, the first percentage is greater than the second percentage, and the determining a maximum reference value of the HDR image based on the maximum RGB component value of the first pixel corresponding to the first percentage and the maximum RGB component value of the second pixel corresponding to the second percentage includes: determining a difference between the maximum RGB component value of the first pixel corresponding to the first percentage and the maximum RGB component value of the second pixel corresponding to the second percentage as a luminance variance range of the HDR image; and determining the maximum reference value based on the luminance variance range.

In a possible implementation, the luminance variance range variance_maxrgb is determined according to the following formula:

$$\text{variance\_maxrgb} = P_{K_1} - P_{K_2},$$

where $K_1$ represents the first percentage, $P_{K_1}$ represents the maximum RGB component value of the first pixel, $K_2$ represents the second percentage, $P_{K_2}$ represents the maximum RGB component value of the second pixel, $K_1$ and $K_2$ are preset values, $K_1 - K_2 \geq 0.5$, $0 < K_1 < 1$, and $0 < K_2 < 1$.

In a possible implementation, the image information further includes the largest value in the maximum RGB component values of the plurality of pixels and an average value of the maximum RGB component values of the plurality of pixels, and the determining the maximum reference value based on the luminance variance range includes: determining the maximum reference value based on the luminance variance range, the largest value in the maximum RGB component values of the plurality of pixels, and the average value of the maximum RGB component values of the plurality of pixels.

In a possible implementation, the maximum reference value MAX is determined according to the following formula:

$$\text{MAX} = B \times \text{maximum\_maxrgb} + A \times (2 \times \text{average\_maxrgb}) + (1 - A - B) \times \text{variance\_maxrgb},$$

where $$A = (1-B) \times \left(1 - F\left(\frac{\text{average\_maxrgb}}{\text{maximum\_maxrgb}}\right)\right),$$

maximum_maxrgb represents the largest value in the maximum RGB component values of the plurality of pixels, average_maxrgb represents the average value of the maximum RGB component values of the plurality of pixels, variance_maxrgb represents the luminance variance range, F( ) represents a preset function, and B is a preset value.

In a possible implementation, the maximum reference value MAX is determined according to the following formula:

$$\text{MAX} = A \times P_{K_1} + (1-A) \times P_{K_2},$$

where $K_1$ represents the first percentage, $P_{K_1}$ represents the maximum RGB component value of the first pixel, $K_2$ represents the second percentage, $P_{K_2}$ represents the maximum RGB component value of the second pixel, A, $K_1$, and $K_2$ are preset values, $0 < A < 1$, $0 < K_1 < 1$, and $0 < K_2 < 1$.

In a possible implementation, each hierarchy interval corresponds to one expression, the expression is used to calculate the maximum luminance modification value, and the determining a maximum luminance modification value of the HDR image based on the maximum reference value and a plurality of preset hierarchy intervals includes: determining, from the plurality of hierarchy intervals, a first hierarchy interval to which the maximum reference value belongs, where the first hierarchy interval corresponds to a first expression; and determining the maximum luminance modification value according to the first expression.

In a possible implementation, the maximum luminance modification value maximum_maxrgb1 of the HDR image is determined according to the following formula:

$$\text{maximum\_maxrgb1} = \begin{cases} \text{MaxRefDisplay}, & \text{MAX} > \text{MaxRefDisplay} \\ \text{MAX}, & \text{MIN} \leq \text{MAX} \leq \text{MaxRefDisplay} \\ \text{MIN}, & \text{MAX} < \text{MIN} \end{cases},$$

where

MaxRefDisplay represents maximum display luminance that is of a reference display device and that is applicable before the dynamic range of the HDR image is adjusted, MIN represents a preset hierarchy threshold, and MAX represents the maximum reference value.

In a possible implementation, the method further includes: if the maximum luminance modification value is less than maximum display luminance that is of a current display device and that is applicable after the dynamic range of the HDR image is adjusted, updating the maximum luminance modification value maximum_maxrgb1 to the maximum display luminance of the current display device.

In a possible implementation, the method further includes: verifying accuracy of the maximum luminance modification value based on a maximum RGB component value of a third pixel corresponding to a third percentage in the HDR image, a maximum RGB component value of a fourth pixel corresponding to the third percentage in a processed image, a maximum RGB component value of a fifth pixel corresponding to a fourth percentage in the HDR image, and a maximum RGB component value of a sixth pixel corresponding to the fourth percentage in the processed HDR image, where the processed image is an image obtained by adjusting the dynamic range of the HDR image.

In a possible implementation, the verifying accuracy of the maximum modification value based on a maximum RGB component value of a third pixel corresponding to a third percentage in the HDR image, a maximum RGB component value of a fourth pixel corresponding to the third percentage in a processed image, a maximum RGB component value of a fifth pixel corresponding to a fourth percentage in the HDR image, and a maximum RGB component value of a sixth pixel corresponding to the fourth percentage in the processed HDR image includes: when $P_{K_3} \neq P_{K_4}$ and $P'_{K_3} - P'_{K_4} > T$, determining that the maximum luminance modification value is accurate, where $K_3 - K_4 < M$, M is a preset first threshold, T is a preset second threshold, $0 < T < 2$, $K_3$ represents the third percentage, $P_{K_3}$ represents the maximum RGB component value of the third pixel, $P'_{K_3}$ represents the maximum RGB component value of the fourth pixel, $K_4$ represents the fourth percentage, $P_{K_4}$ represents the maximum RGB component value of the fifth pixel, and $P'_{K_4}$ represents the maximum RGB component value of the sixth pixel.

According to a sixth aspect, an embodiment further provides an image processing method. The method includes: obtaining image information of a to-be-processed image, where the to-be-processed image includes a plurality of pixels, the image information includes a first maximum RGB component value corresponding to a first ratio and a second maximum RGB component value corresponding to a second ratio, the first ratio indicates a ratio of a quantity of pixels with maximum RGB component values less than or equal to the first maximum RGB component value in the plurality of pixels to a quantity of the plurality of pixels, the second ratio indicates a ratio of a quantity of pixels with maximum RGB component values less than or equal to the second maximum RGB component value in the plurality of pixels to the quantity of the plurality of pixels, and the maximum RGB component value indicates a largest component value in an R component value, a G component value, and a B component value of a pixel; determining a maximum reference value of the to-be-processed image based on the first maximum RGB component value corresponding to the first ratio and the second maximum RGB component value corresponding to the second ratio; adjusting a largest value in maximum RGB component values of the plurality of pixels based on the maximum reference value and a plurality of preset hierarchy intervals, to determine a maximum luminance modification value of the to-be-processed image, where each of the plurality of hierarchy intervals corresponds to one value range corresponding to the maximum reference value; and adjusting a dynamic range of the to-be-processed image based on the maximum luminance modification value.

In a possible implementation, the first ratio is greater than the second ratio, and the determining a maximum reference value of the to-be-processed image based on the first maximum RGB component value corresponding to the first ratio and the second maximum RGB component value corresponding to the second ratio includes: determining a difference between the first maximum RGB component value corresponding to the first ratio and the second maximum RGB component value corresponding to the second ratio as a luminance variance range of the to-be-processed image; and determining the maximum reference value based on the luminance variance range.

In a possible implementation, the luminance variance range variance_maxrgb is determined according to the following formula:

$$\text{variance\_maxrgb} = P_{K_1} - P_{K2},$$

where $K_1$ represents the first ratio, $P_{K_1}$ represents the first maximum RGB component value, $K_2$ represents the second ratio, $P_{K_2}$ represents the second maximum RGB component value, $K_1$ and $K_2$ are preset values, $K_1 - K_2 \geq 0.5$, $0 < K_1 < 1$, and $0 < K_2 < 1$.

In a possible implementation, the image information further includes the largest value in the maximum RGB component values of the plurality of pixels and an average value of the maximum RGB component values of the plurality of pixels, and the determining the maximum reference value based on the luminance variance range includes: determining the maximum reference value based on the luminance variance range, the largest value in the maximum RGB component values of the plurality of pixels, and the average value of the maximum RGB component values of the plurality of pixels.

In a possible implementation, the maximum reference value MAX is determined according to the following formula:

$$\text{MAX} = B \times \text{maximum\_maxrgb} + A \times (2 \times \text{average\_maxrgb}) + (1 - A - B) \times \text{variance\_maxrgb},$$

where $$A = (1 - B) \times \left(1 - F\left(\frac{\text{average\_maxrgb}}{\text{maximum\_maxrgb}}\right)\right),$$

maximum_maxrgb represents the largest value in the maximum RGB component values of the plurality of pixels, average_maxrgb represents the average value of the maximum RGB component values of the plurality of pixels, variance_maxrgb represents the luminance variance range, F( ) represents a preset function, and B is a preset value.

In a possible implementation, the maximum reference value MAX is determined according to the following formula:

$$\text{MAX} = A \times P_{K_1} + (1 - A) \times P_{K_2},$$

where $K_1$ represents the first ratio, $P_{K_1}$ represents the first maximum RGB component value, $K_2$ represents the second ratio, $P_{K_2}$ represents the second maximum RGB component value, A, $K_1$, and $K_2$ are preset values, $0 < A < 1$, $0 < K_1 < 1$, and $0 < K_2 < 1$.

In a possible implementation, each hierarchy interval corresponds to one expression, the expression is used to calculate the maximum luminance modification value, and the maximum luminance modification value maximum_maxrgb1 is determined according to the following formula:

$$\text{maximum\_maxrgb1} = \begin{cases} MaxRefDisplay, & MAX > MaxRefDisplay \\ MAX, & MIN \le MAX \le MaxRefDisplay \\ MIN, & MAX < MIN \end{cases},$$

where

MaxRefDisplay represents maximum display luminance that is of a reference display device and that is applicable before the dynamic range of the to-be-processed image is adjusted, MIN represents a preset hierarchy threshold, and MAX represents the maximum reference value.

In a possible implementation, the method further includes: if the maximum luminance modification value is less than maximum display luminance that is of a current display device and that is applicable after the dynamic range of the to-be-processed image is adjusted, changing the maximum luminance modification value maximum_maxrgb1 to the maximum display luminance of the current display device.

In a possible implementation, the method further includes: verifying accuracy of the maximum luminance modification value based on a third maximum RGB component value corresponding to a third ratio, a fourth maximum RGB component value corresponding to the third ratio, a fifth maximum RGB component value corresponding to a fourth ratio, and a sixth maximum RGB component value corresponding to the fourth ratio, where the third ratio indicates a ratio of a quantity of pixels with maximum RGB component values less than or equal to the third maximum RGB component value in the plurality of pixels to the quantity of the plurality of pixels, the fourth maximum RGB component value satisfies the following case that a ratio of a quantity of pixels with maximum RGB component values less than or equal to the fourth maximum RGB component value in pixels of a processed image to a quantity of the pixels of the processed image is the third ratio, the fourth ratio indicates a ratio of a quantity of pixels with maximum RGB component values less than or equal to the fifth maximum RGB component value in the plurality of pixels to the quantity of the plurality of pixels, the sixth maximum RGB component value satisfies the following case that a ratio of a quantity of pixels with maximum RGB component values less than or equal to the sixth maximum RGB component value in the pixels of the processed image to the quantity of the pixels of the processed image is the fourth ratio, and the processed image is an image obtained by adjusting the dynamic range of the to-be-processed image.

In a possible implementation, the verifying accuracy of the maximum luminance modification value based on a third maximum RGB component value corresponding to a third ratio, a fourth maximum RGB component value corresponding to the third ratio, a fifth maximum RGB component value corresponding to a fourth ratio, and a sixth maximum RGB component value corresponding to the fourth ratio includes:

when $P_{K_3} \ne P_{K_4}$ and $P'_{K_3} - P'_{K_4} > T$, determining that the maximum luminance modification value is accurate, where $K_3 - K_4 < M$, M is a preset first threshold, T is a preset second threshold, $0 < T < 2$, $K_3$ represents the third ratio, $P_{K_3}$ represents the third maximum RGB component value, $P'_{K_3}$ represents the fourth maximum RGB component value, $K_4$ represents the fourth ratio, $P_{K_4}$ represents the fifth maximum RGB component value, and $P'_{K_4}$ represents the sixth maximum RGB component value.

In a possible implementation, the method further includes at least one of the following steps: determining the first maximum RGB component value based on the first ratio and the plurality of pixels; determining the second maximum RGB component value based on the second ratio and the plurality of pixels; determining the third maximum RGB component value based on the third ratio and the plurality of pixels; determining the fourth maximum RGB component value based on the third ratio and the pixels of the processed image; determining the fifth maximum RGB component value based on the fourth ratio and the plurality of pixels; or determining the sixth maximum RGB component value based on the fourth ratio and the pixels of the processed image.

According to a seventh aspect, an embodiment further provides an image processing apparatus. The apparatus is configured to perform the method according to any one of the fifth aspect or the possible implementations of the fifth aspect. Optionally, the apparatus may include units configured to perform the method according to any one of the fifth aspect or the possible implementations of the fifth aspect.

According to an eighth aspect, an embodiment further provides an image processing apparatus. The apparatus is configured to perform the method according to any one of the sixth aspect or the possible implementations of the sixth aspect. Optionally, the apparatus may include units configured to perform the method according to any one of the sixth aspect or the possible implementations of the sixth aspect.

According to a ninth aspect, an embodiment further provides an image processing device. The device includes a processor and a memory. The processor is coupled to the memory. The processor is configured to enable the apparatus to perform the method according to any one of the foregoing aspects or the possible implementations of the foregoing aspects.

According to a tenth aspect, an embodiment further provides a chip apparatus. The chip apparatus includes an input interface, an output interface, at least one processor, and a memory. The input interface, the output interface, the processor, and the memory communicate with each other through an internal connection path. The processor is configured to execute code in the memory. When the processor executes the code, the chip apparatus implements the method according to any one of the foregoing aspects or the possible implementations of the foregoing aspects.

According to an eleventh aspect, a computer-readable storage medium is configured to store a computer program. The computer program includes instructions for implementing the method according to any one of the foregoing aspects or the possible implementations of the foregoing aspects.

According to a twelfth aspect, a computer program product includes instructions. When the instructions are run on a computer, the computer is enabled to perform the method according to any one of the foregoing aspects or the possible implementations of the foregoing aspects.

DETAILED DESCRIPTION OF THE EMBODIMENTS

Figure 1:
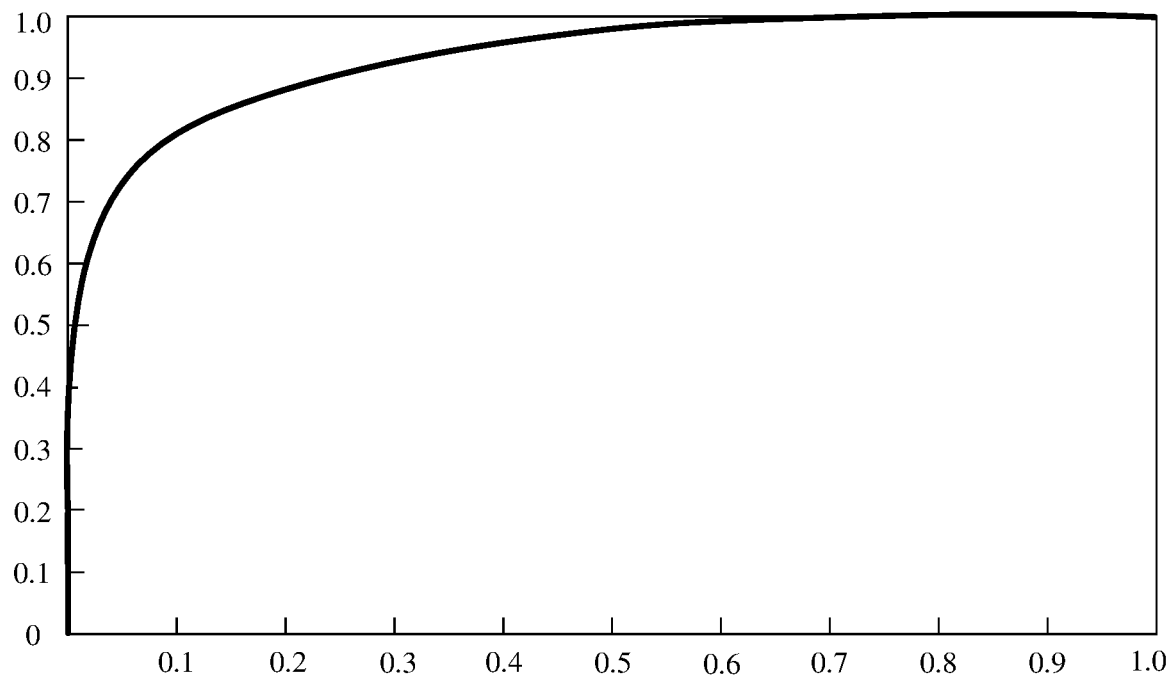
FIG. 1 is a diagram of a PQ opto-electronic transfer function.

The following describes the solutions in the embodiments with reference to the accompanying drawings.

First, related concepts and technologies in the embodiments are briefly described.

A dynamic range is used to indicate a ratio of a maximum value to a minimum value of a variable in many fields. For a digital image, a dynamic range indicates a ratio of maximum luminance to minimum luminance in a range in which the image can be displayed. A dynamic range in nature is quite large. For example, luminance of a night scene in the starry sky is about 0.001 cd/m$^2$, and luminance of the sun is up to 1,000,000,000 cd/m$^2$. Herein, cd/m$^2$ (Candela per square meter) is the derived unit of luminance in the international system of units. Therefore, the dynamic range in nature reaches an order of magnitude of 1,000,000,000/0.001=10$^{13}$.

However, in nature, the luminance of the sun and the luminance of a star are not obtained at the same time. For a natural scene in the real world, a dynamic range is from 10$^{-3}$ to 10$^6$. This dynamic range is quite large, and therefore is usually referred to as a high dynamic range (HDR). Compared with the high dynamic range, a dynamic range for a common image is referred to as a low dynamic range (LDR). Therefore, it may be understood that an imaging process of a digital camera is actually a mapping process from a high dynamic range for the real world to a low dynamic range for a photo.

A larger dynamic range of an image indicates more scene details and richer light levels that are shown by the image and a more vivid visual effect. For a conventional digital image, one pixel value is generally stored by using one-byte (that is, 8-bit) space. For a high dynamic range image, one pixel value is stored by using a plurality of bytes of a floating point number, and therefore a high dynamic range for a natural scene can be represented.

In an optical digital imaging process (for example, an imaging process of a digital camera), optical radiation in a real scene is converted into an electrical signal by using an image sensor, and the electrical signal is stored in a form of a digital image. Image display aims to reproduce, by using a display device, a real scene described by a digital image. An ultimate objective of the optical digital imaging process and the image display is to enable a user to obtain visual perception the same as that obtained when the user directly observes the real scene.

Brightness levels that can be demonstrated by optical radiation (optical signals) for the real scenario are almost linear. Therefore, the optical signal is also referred to as a linear signal. However, in a process of converting an optical signal into an electrical signal in optical digital imaging, not every optical signal corresponds to one electrical signal. In addition, an electrical signal obtained through conversion is non-linear. Therefore, the electrical signal is also referred to as a non-linear signal.

An opto-electronic transfer function (OETF) indicates a conversion relationship between a linear signal of an image pixel and a nonlinear signal. A display device is continuously upgraded. Compared with a conventional display device, a current display device can display a dynamic range that continuously increases. An existing consumer-level HDR display can have a display range of up to 600 cd/m$^2$, and a high-end HDR display can have a display range of up to 2000 cd/m$^2$, which are far beyond a display range of a conventional SDR display device. An opto-electronic transfer function applicable to the conventional SDR display device in the International Telecommunication Union-Radiocommunication Sector (ITU-R) BT.1886 standard protocol can no longer well express display performance of a current HDR display device. Therefore, it is necessary to improve the opto-electronic transfer function to adapt to upgrading of the HDR display device.

In the embodiments, HDR opto-electronic transfer functions OETFs include the following three types: a perceptual quantizer (PQ) opto-electronic transfer function, a hybrid log-gamma (HLG) opto-electronic transfer function, and a scene luminance fidelity (SLF) opto-electronic transfer function. The three opto-electronic transfer functions are specified in the Audio Video Coding Standard (AVS).

The PQ opto-electronic transfer function is a perceptual quantizer opto-electronic transfer function provided based on a brightness perception model for human eyes. Refer to FIG. 1. FIG. 1 is a diagram of a PQ opto-electronic transfer function.

The PQ opto-electronic transfer function indicates a conversion relationship between a linear signal value of an image pixel and a nonlinear signal value in a PQ domain, and the PQ opto-electronic transfer function may be expressed as Formula (1):

$$\begin{cases} R' = PQ\_TF(\max(0, \min(R/1000\ 0, 1))) \\ G' = PQ\_TF(\max(0, \min(R/1000\ 0, 1))) \\ B' = PQ\_TF(\max(0, \min(R/1000\ 0, 1))) \end{cases} \quad (1)$$

Each parameter in Formula (1) is calculated as follows:

$$L' = PQ\_TF(L) = \left(\frac{c_1 + c_2 L^{m_1}}{1 + c_3 L^{m_1}}\right)^{m_2},$$

where

L represents a linear signal value with a value normalized to [0, 1], L' represents a non-linear signal value with a value range of [0, 1], $m_1$, $m_2$, $c_1$, $c_2$, and $c_3$ are PQ opto-electronic transfer coefficients, $$m_1 = \frac{2610}{4096} \times \frac{1}{4} = 0.1593017578\ 125,$$

$$m_2 = \frac{2523}{4096} \times 128 = 78.84375,\ c_1 = c_3 - c_2 + 1 = \frac{3424}{4096} = 0.8359375,$$

$$c_2 = \frac{2413}{4096} \times 32 = 18.8515625,\ \text{and}\ c_3 = \frac{2392}{4096} \times 32 = 18.6875.$$

Figure 2:
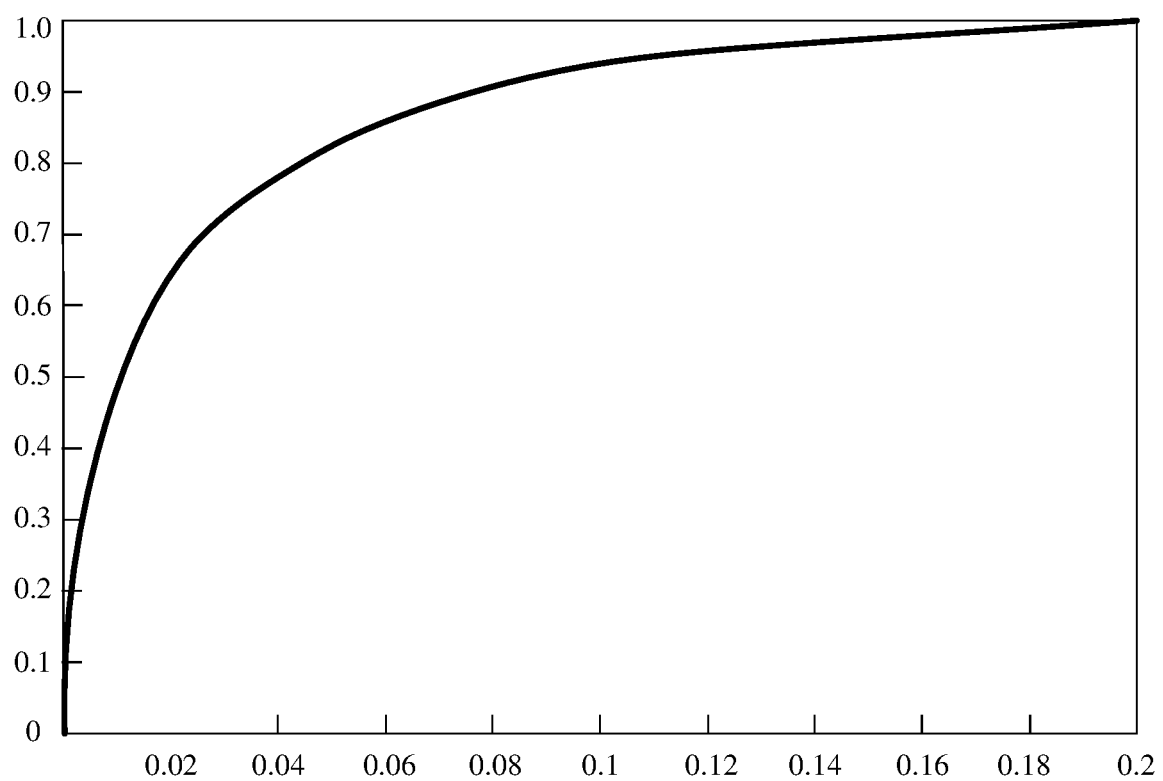
FIG. 2 is a diagram of an HLG opto-electronic transfer function.

The HLG opto-electronic transfer function is obtained by improving a conventional gamma curve. Refer to FIG. 2. FIG. 2 is a diagram of an HLG opto-electronic transfer function.

For the HLG opto-electronic transfer function, the conventional gamma curve is used in the lower half region, and a log curve is supplemented in the upper half region. The HLG opto-electronic transfer function indicates a conversion relationship between a linear signal value of an image pixel and a nonlinear signal value in an HLG domain, and the HLG opto-electronic transfer function may be expressed as Formula (2):

$$L' = \text{HLG\_TF}(L) = \begin{cases} \sqrt{L}/2, 0 \leq L \leq 1 \\ a\ln(L-b)+c, 1 < L \end{cases} \quad (2)$$

L represents a linear signal value with a value range of [0, 12], L represents a non-linear signal value with a value range of [0, 1], a, b, and c are HLG opto-electronic transfer coefficients, a=0.17883277, b=0.28466892, and c=0.55991073.

Figure 3:
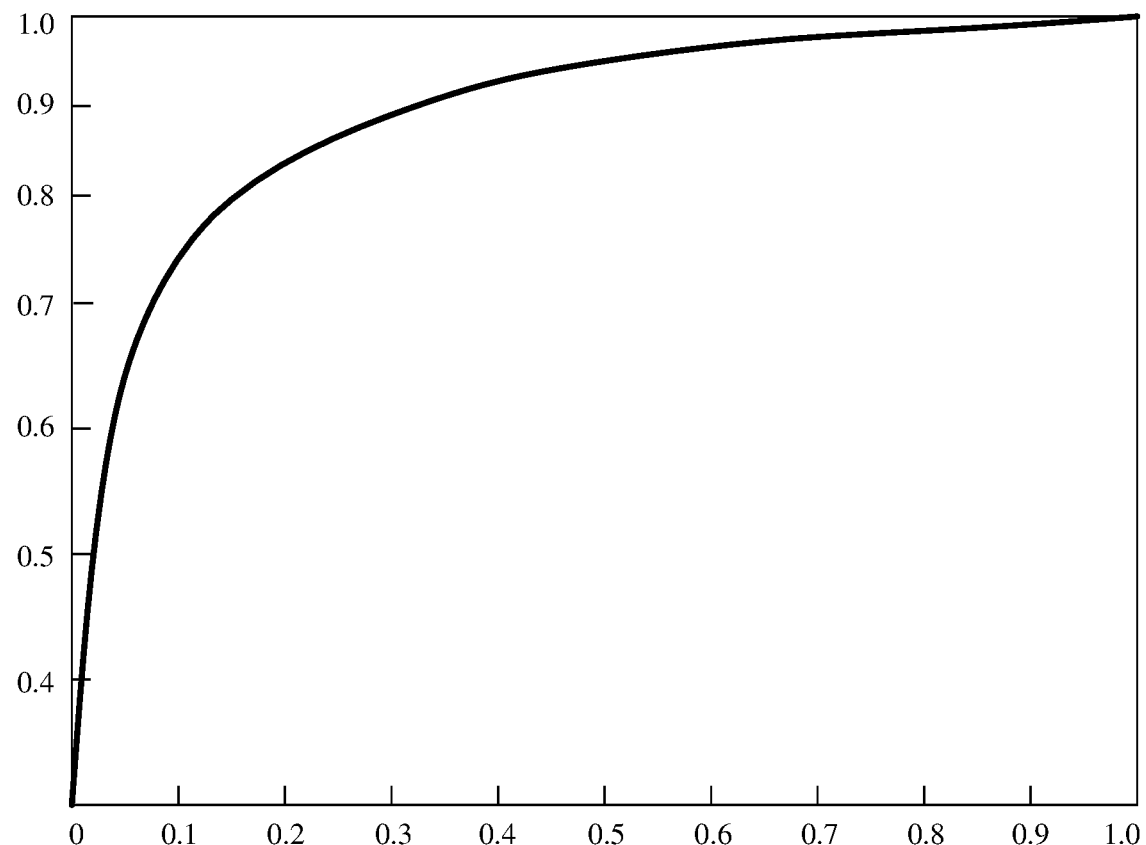
FIG. 3 is a diagram of an SLF opto-electronic transfer function.

The SLF opto-electronic transfer function is an optimal curve obtained based on luminance distribution in an HDR scene when optical characteristics of human eyes are satisfied. Refer to FIG. 3. FIG. 3 is a diagram of an SLF opto-electronic transfer function.

An SLF opto-electronic transfer curve represents a conversion relationship between a linear signal value of an image pixel and a nonlinear signal value in an SLF domain. The conversion relationship between a linear signal value of an image pixel and a nonlinear signal value in an SLF domain is shown in Formula (3):

$$\begin{cases} R' = \text{SLF\_TF}(\max(0, \min(R/10000, 1))) \\ G' = \text{SLF\_TF}(\max(0, \min(R/10000, 1))) \\ B' = \text{SLF\_TF}(\max(0, \min(R/10000, 1))) \end{cases} \quad (3)$$

The SLF opto-electronic transfer function may be expressed as Formula (4):

$$L' = \text{SLF\_TF}(L) = a \times \left(\frac{p \times L}{(p-1) \times L}\right)^m + b \quad (4)$$

L represents a linear signal value with a value normalized to [0, 1], L represents a nonlinear signal value with a value range of [0, 1], p, m, a, and b are SLF opto-electronic transfer coefficients, p=2.3, m=0.14, a=1.12762, and b=−0.12762.

A dynamic range supported by an existing display device is limited, and the display device cannot directly display a high dynamic range image (for example, maximum luminance reaches 1000 nits or 10,000 nits). In addition, different display devices have different display capabilities. Therefore, a dynamic range adjustment algorithm is usually used to adjust a dynamic range of a high dynamic range image based on a display capability of a display device.

In other words, a dynamic range of an HDR image is adjusted to a dynamic range supported by a display device for display, or a dynamic range of an HDR image is adjusted from a dynamic range supported by a display device (for example, a reference display device) to a dynamic range supported by another display device (for example, a current display device) for display. Herein, nit (nit) is a unit for representing luminance and is equivalent to Candela per square meter (cd/m$^2$).

However, in the conventional technology, only parameters such as a maximum statistical value of image content, a minimum statistical value of the image content, and maximum luminance and minimum luminance of a display device are used. Using this manner may cause a loss of a relatively large quantity of light levels of an adjusted HDR image. Consequently, a display effect after adjustment is poor.

In view of this, an HDR image processing method calculates a maximum modification value of an HDR image based on image information of the HDR image, where the image information includes a maximum RGB component value of a first pixel corresponding to a first percentage and a maximum RGB component value of a second pixel corresponding to a second percentage, both the first percentage and the second percentage are greater than 0 and less than 1, and the maximum modification value is used to modify a largest value in maximum RGB component values of a plurality of pixels included in the HDR image. Then, a dynamic range of the HDR image is adjusted based on the maximum modification value. In this way, a display effect of the HDR image can be improved.

It should be noted that the HDR image in the embodiments may be an optical signal or an electrical signal. This is not limited.

It should be further noted that when the HDR image is an optical signal, the optical signal may be converted into an electrical signal by using the foregoing three opto-electronic transfer functions.

Figure 4:
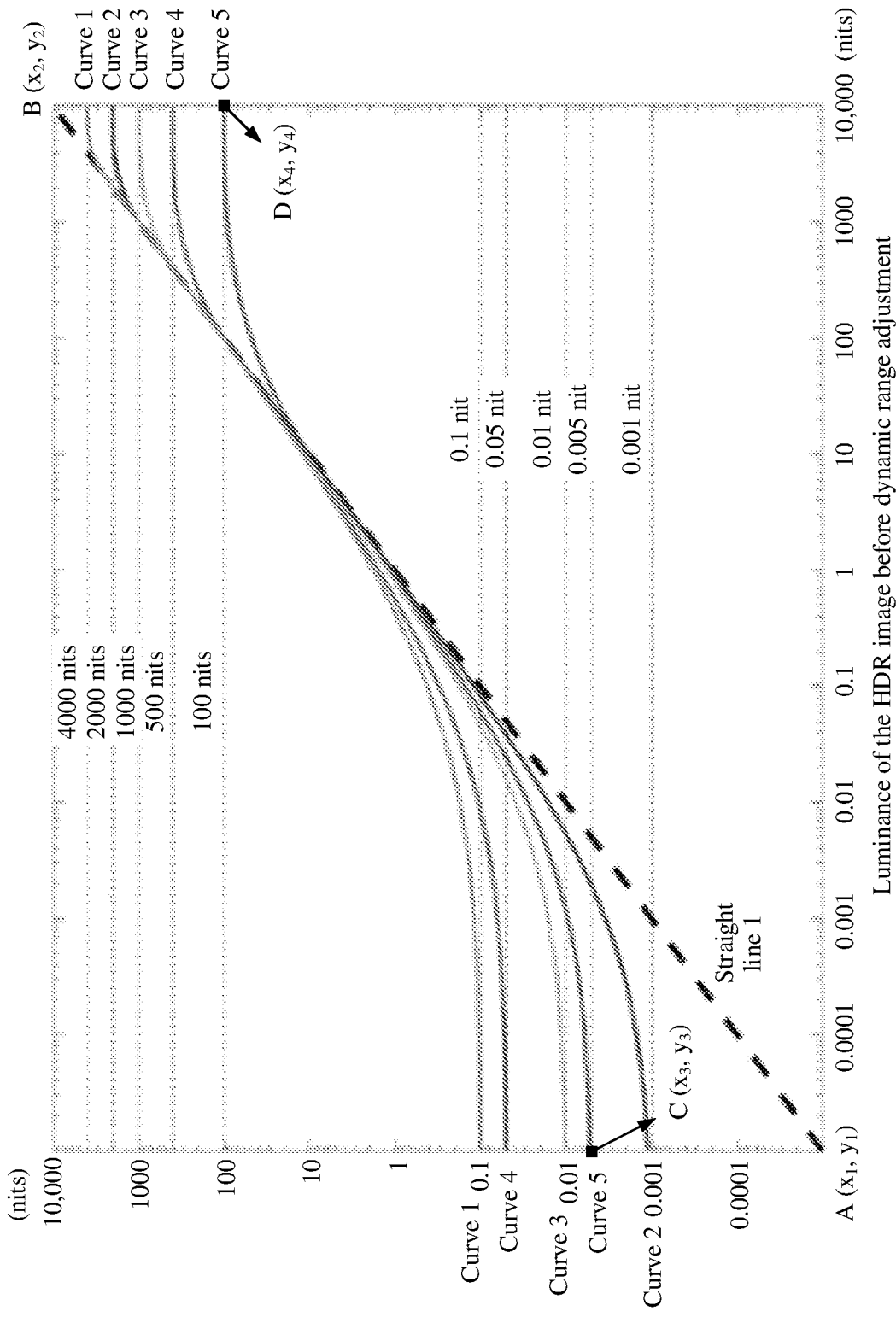
FIG. 4 is a schematic diagram of a dynamic range adjustment curve of a high dynamic range image according to an embodiment.

In a possible implementation, FIG. 4 is a schematic diagram of a dynamic range adjustment curve of an HDR image when the HDR image that can be displayed by a reference display device is displayed by a current display device. As shown in FIG. 4, a horizontal axis in the figure indicates luminance of the HDR image before dynamic range adjustment, and a vertical axis indicates luminance of the image after dynamic range adjustment. A curve 1 to a curve 5 are examples of several different adjustment curves. These curves are all in an "S" shape, and slopes of the curves each increase first and then decrease. Two endpoints ($L_1$, $L'_1$) and ($L_2$, $L'_2$) are connected by using a smooth "S" curve, and the curve is used to adjust the dynamic range of the HDR image. The dynamic range of the HDR image is adjusted from a dynamic range [$L_1$, $L_2$] supported by the reference display device to a dynamic range [$L'_1$, $L'_2$] supported by the current display device. $L_1$ usually represents a maximum content light level of an image, and is a largest real value, for example, OETF (10,000 nits), obtained by collecting statistics on image content of the HDR image. $L_2$ usually represents a minimum content light level of the image, and is a smallest value, for example, 0, obtained by collecting statistics on the image content of the HDR image. $L'_1$ is maximum luminance, for example, OETF (100 nits), of the display device, and $L'_2$ is minimum luminance, for example, OETF (0.005 nit), of the display device.

The curve 5 is used as an example. The two endpoints ($L_1$, $L'_1$) and ($L_2$, $L'_2$) are A ($x_1$, $y_1$) and B ($x_2$, $y_2$). C ($x_3$, $y_3$) and D ($x_4$, $y_4$) are connected by using a smooth S curve, and the curve (that is, the curve 5) indicates that the dynamic range of the HDR image is adjusted from 0 (nits)-10,000 (nits) to 0.005 (nit)-100 (nits). Then, a display device with a corresponding luminance range may display a compressed image with a dynamic range of 0.005 (nit)-100 (nits).

The dynamic range of the HDR image may be adjusted based on the maximum content light level $L_1$ of the HDR image. In many natural scenes, luminance of only a few pixels, for example, noise points, is close to $L_1$ or equal to $L_1$, and differences between luminance of most of remaining pixels and $L_1$ are large. Consequently, an adjusted image displayed by the display device is dark overall, and a visual effect is poor.

To resolve this problem, an embodiment further provides a method for calculating a maximum modification value of an HDR image. The maximum modification value is used to modify a largest value in maximum RGB component values of a plurality of pixels of the HDR image, and the maximum modification value of the HDR image obtained through calculation by using the method is applied to adjustment of a dynamic range of the HDR image. This can further improve a visual effect of the HDR image displayed by a display device.

Figure 5:
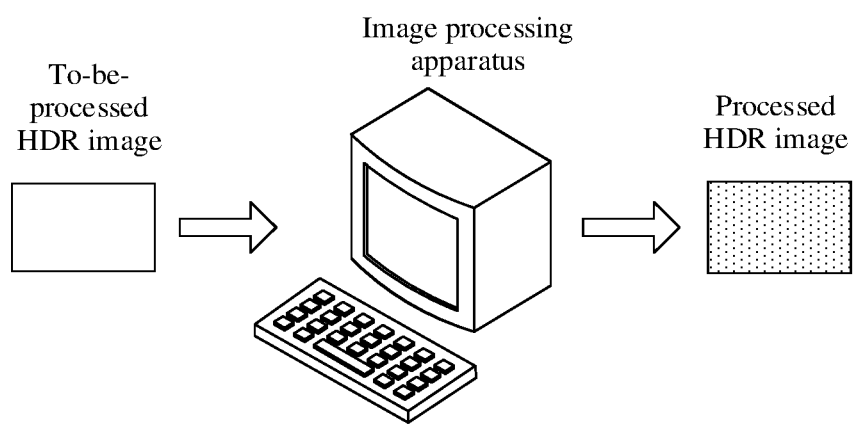
FIG. 5 is an application scenario of image processing according to an embodiment.

FIG. 5 is an HDR image processing method according to an embodiment. As shown in FIG. 5, after obtaining a to-be-processed HDR image, an image processing apparatus adjusts a dynamic range of the to-be-processed HDR image, and outputs an adjusted HDR image.

Figure 6:
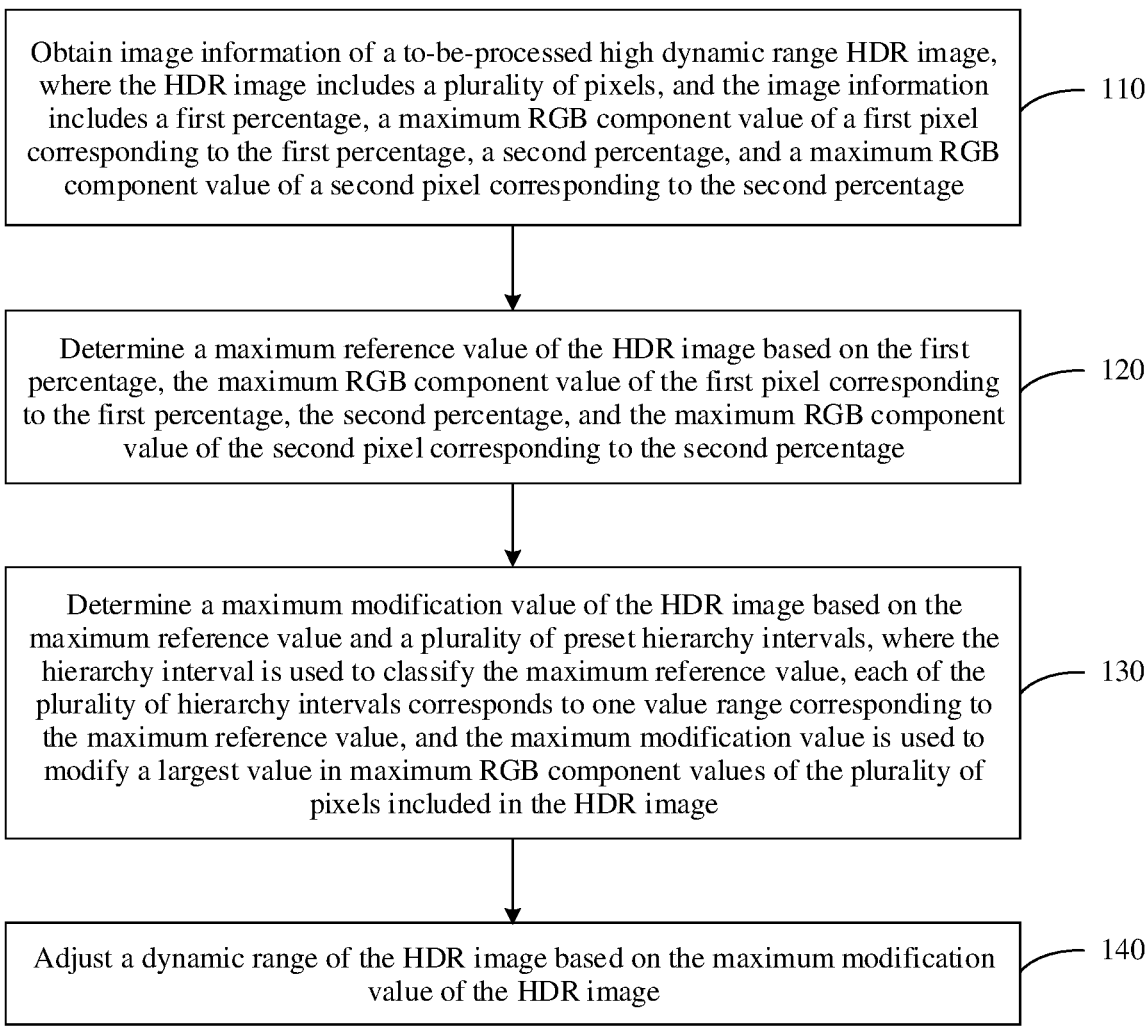
FIG. 6 is a schematic flowchart of a high dynamic range image processing method according to an embodiment.

FIG. 6 is a schematic flowchart of an HDR image processing method 100 according to an embodiment. The method 100 is applicable to FIG. 5, and is performed by, for example, the image processing apparatus shown in FIG. 5. As shown in FIG. 6, the method 100 includes the following S110 to S140.

S110: Obtain image information of a to-be-processed HDR image, where the HDR image includes a plurality of pixels, the image information includes a first percentage, a maximum RGB component value of a first pixel corresponding to the first percentage, a second percentage, and a maximum RGB component value of a second pixel corresponding to the second percentage, the first percentage indicates a percentage of at least one pixel with a maximum RGB component value less than or equal to the maximum RGB component value of the first pixel in the plurality of pixels to the plurality of pixels, the second percentage indicates a percentage of at least one pixel with a maximum RGB component value less than or equal to the maximum RGB component value of the second pixel in the plurality of pixels to the plurality of pixels, the maximum RGB component value indicates a largest value in an R component value, a G component value, and a B component value of a pixel, and both the first percentage and the second percentage are greater than 0 and less than 1.

Optionally, the first percentage may be a first proportion, and the second percentage may be a second proportion.

The first percentage indicates a percentage of at least one pixel with a maximum RGB component value less than or equal to the maximum RGB component value of the first pixel in the plurality of pixels to the plurality of pixels, the second percentage indicates a percentage of at least one pixel with a maximum RGB component value less than or equal to the maximum RGB component value of the second pixel in the plurality of pixels to the plurality of pixels, the maximum RGB component value indicates a largest value in an R component value, a G component value, and a B component value of a pixel, and both the first percentage and the second percentage are greater than 0 and less than 1.

For example, the HDR image includes four pixels, a maximum RGB component value of a first pixel is 80, a maximum RGB component value of a second pixel is 30, a maximum RGB component value of a third pixel is 60, and a maximum RGB component value of a fourth pixel is 55.

In this case, 25% corresponds to the second pixel, 50% corresponds to the fourth pixel, 75% corresponds to the third pixel, and 100% corresponds to the first pixel.

In the four pixels, a pixel (the second pixel) with a maximum RGB component value less than or equal to 30 accounts for 25% of the four pixels, pixels (the second pixel and the fourth pixel) with maximum RGB component values less than or equal to 55 account for 50% of the four pixels, pixels (the second pixel, the fourth pixel, and the third pixel) with maximum RGB component values less than or equal to 60 account for 75% of the four pixels, and pixels (the second pixel, the fourth pixel, the third pixel, and the first pixel) with maximum RGB component values less than or equal to 80 account for 100% of the four pixels.

It should be noted that the plurality of pixels included in the HDR image may be understood as a plurality of pixels included in an active display area of the HDR image, and the active display area may be some or all areas of the HDR image.

For example, the active display area of the HDR image may be a rectangular area jointly determined based on a horizontal display size and a vertical display size.

Optionally, in S110, the image processing apparatus may obtain the image information of the HDR image in a plurality of manners. This is not limited in this embodiment.

In a possible implementation, the image processing apparatus may calculate the image information of the HDR image by using an existing method, to obtain the image information.

In another possible implementation, the image processing apparatus may obtain the image information based on metadata carried in the HDR image.

Optionally, S110 may alternatively be: obtaining image information of a to-be-processed HDR image, where the HDR image includes a plurality of pixels, the image information includes a maximum RGB component value of a first pixel corresponding to a first percentage and a maximum RGB component value of a second pixel corresponding to a second percentage, the first percentage indicates a percentage of at least one pixel with a maximum RGB component value less than or equal to the maximum RGB component value of the first pixel in the plurality of pixels to the plurality of pixels, the second percentage indicates a percentage of at least one pixel with a maximum RGB component value less than or equal to the maximum RGB component value of the second pixel in the plurality of pixels to the plurality of pixels, the maximum RGB component value indicates a largest value in an R component value, a G component value, and a B component value of a pixel, and both the first percentage and the second percentage are greater than 0 and less than 1.

Optionally, the first percentage may be understood as a first proportion or a first ratio, and the second percentage may be understood as a second proportion or a second ratio.

Optionally, the image processing apparatus may obtain the maximum RGB component value of the first pixel corresponding to the first percentage and the maximum RGB component value of the second pixel corresponding to the second percentage in a plurality of manners. This is not limited in this embodiment.

In a possible implementation, the image processing apparatus may determine an R component value, a G component value, and a B component value of each of the plurality of pixels included in the HDR image, determine a largest value in the R component value, the G component value, and the B component value of each pixel as a maximum RGB component value of the pixel, and determine, based on the maximum RGB component value of each of the plurality of pixels, the maximum RGB component value of the first pixel corresponding to the first percentage and the maximum RGB component value of the second pixel corresponding to the second percentage, where a percentage of a quantity of pixels that are in the plurality of pixels and whose maximum RGB component values are less than or equal to the maximum RGB component value of the first pixel to a quantity of the plurality of pixels is the first percentage, and a percentage of a quantity of pixels that are in the plurality of pixels and whose maximum RGB component values are less than or equal to the maximum RGB component value of the second pixel to the quantity of the plurality of pixels is the second percentage.

S120: Determine a maximum reference value of the HDR image based on the first percentage, the maximum RGB component value of the first pixel corresponding to the first percentage, the second percentage, and the maximum RGB component value of the second pixel corresponding to the second percentage.

Optionally, the image processing apparatus may determine the maximum reference value of the HDR image based on the first percentage, the maximum RGB component value of the first pixel corresponding to the first percentage, the second percentage, and the maximum RGB component value of the second pixel corresponding to the second percentage in a plurality of manners. This is not limited in this embodiment.

In a possible implementation, the image processing apparatus may determine the maximum reference value MAX according to Formula (5):

$$\text{MAX} = A \times P_{K_1} + (1-A) \times P_{K_2} \qquad (5)$$

$K_1$ represents the first percentage, $P_{K_1}$ represents the maximum RGB component value of the first pixel, $K_2$ represents the second percentage, $P_{K_2}$ represents the maximum RGB component value of the second pixel, A, $K_1$, and $K_2$ are preset values, $0<A<1$, $0<K_1<1$, and $0<K_2<1$.

According to the HDR image processing method provided in this embodiment, $P_{K_1}$ and $P_{K_2}$ are maximum RGB component values of two pixels of the HDR image other than a maximum content light level and a minimum content light level of the HDR image, a maximum reference value is calculated based on the two pixels, and a largest value in maximum RGB component values of the HDR image is finally adjusted based on the maximum reference value. This can avoid a case in the conventional technology in which an adjusted image is excessively dark after the image has been adjusted based on maximum luminance.

Optionally, the image information further includes an average value of maximum RGB component values of the plurality of pixels, and the image processing apparatus may determine the maximum reference value based on the first percentage, the maximum RGB component value of the first pixel, the second percentage, the maximum RGB component value of the second pixel, a largest value in the maximum RGB component values of the plurality of pixels, and the average value of the maximum RGB component values of the plurality of pixels.

In another possible implementation, the image processing apparatus may determine the maximum reference value MAX according to Formula (6):

$$\text{MAX} = B \times \text{maximum\_maxrgb} + \qquad (6)$$
$$A \times (2 \times \text{average\_maxrgb}) + (1 - A - B) \times (P_{K_1} - P_{K_2})$$
$$A = (1-B) \times \left(1 - F\left(\frac{\text{average\_maxrgb}}{\text{maximum\_maxrgb}}\right)\right),$$

maximum_maxrgb represents the largest value in the maximum RGB component values of the plurality of pixels, average_maxrgb represents the average value of the maximum RGB component values of the plurality of pixels, $K_1$ represents the first percentage, $P_{K_1}$ represents the maximum RGB component value of the first pixel, $K_2$ represents the second percentage, $P_{K_2}$ represents the maximum RGB component value of the second pixel, F( ) represents a preset function, B, $K_1$, and $K_2$ are preset values, $0<B<1$, $K_1-K_2\geq 0.5$, $0<K_1<1$, and $0<K_2<1$.

Optionally, S120 may alternatively be: determining a maximum reference value of the HDR image based on the maximum RGB component value of the first pixel corresponding to the first percentage and the maximum RGB component value of the second pixel corresponding to the second percentage.

Optionally, the image processing apparatus may determine a difference between the maximum RGB component value of the first pixel corresponding to the first percentage and the maximum RGB component value of the second pixel corresponding to the second percentage as a luminance variance range of the HDR image and determine the maximum reference value based on the luminance variance range.

In a possible implementation, the image processing apparatus may determine the luminance variance range variance_maxrgb according to Formula (7):

$$\text{variance\_maxrgb} = P_{K_1} - P_{K_2} \qquad (7)$$

$K_1$ represents the first percentage, $P_{K_1}$ represents the maximum RGB component value of the first pixel, $K_2$ represents the second percentage, $P_{K_2}$ represents the maximum RGB component value of the second pixel, $K_1$ and $K_2$ are preset values, $K_1-K_2\geq 0.5$, $0<K_1<1$, and $0<K_2<1$.

Optionally, the image information further includes the largest value in the maximum RGB component values of the plurality of pixels and an average value of the maximum RGB component values of the plurality of pixels, and the image processing apparatus may determine the maximum reference value based on the luminance variance range, the largest value in the maximum RGB component values of the plurality of pixels, and the average value of the maximum RGB component values of the plurality of pixels.

In another possible implementation, the image processing apparatus may determine the maximum reference value MAX according to Formula (8):

$$\text{MAX} = B \times \text{maximum\_maxrgb} + \qquad (8)$$
$$A \times (2 \times \text{average\_maxrgb}) + (1 - A - B) \times \text{variance\_maxrgb}$$
$$A = (1-B) \times \left(1 - F\left(\frac{\text{average\_maxrgb}}{\text{maximum\_maxrgb}}\right)\right),$$

maximum_maxrgb represents the largest value in the maximum RGB component values of the plurality of pixels, average_maxrgb represents the average value of the maximum RGB component values of the plurality of pixels, variance_maxrgb represents the luminance variance range, F( ) represents a preset function, and B is a preset value.

Optionally, the function F( ) in Formula (6) or Formula (8) may be a constant function or an increasing function. This is not limited in this embodiment.

For example, $F(x)=x$, $F(x)=x^N$, $F(x)=\log x$, or $F(x)=ax+b$, where a and b are constants.

For another example, in Formula (6) and Formula (8), a value of B may be $\frac{1}{3}$.

According to the HDR image processing method provided in this embodiment, maximum_maxrgb indicates a largest value in the maximum RGB component values of the pixels corresponding to 100%, 2×average_maxrgb indicates 2 times of an average value of the maximum RGB component values of the pixels corresponding to 100%, and $K_1-K_2 \geq 0.5$ indicates maximum RGB component values of pixels corresponding to a percentage greater than 50%; different weights are set for the three dimensions to obtain a final maximum reference value, and the largest value in the maximum RGB component values of the HDR image is finally adjusted based on the maximum reference value. This can avoid a case in the conventional technology in which an adjusted image is excessively dark after the image has been adjusted based on maximum luminance.

S130: Determine a maximum modification value of the HDR image based on the maximum reference value and a plurality of preset hierarchy intervals, where the hierarchy interval is used to classify the maximum reference value, each of the plurality of hierarchy intervals corresponds to one value range corresponding to the maximum reference value, and the maximum modification value is used to modify the largest value in the maximum RGB component values of the plurality of pixels included in the HDR image.

It should be noted that, classifying a parameter (for example, the maximum reference value) (also referred to as parameter classification) is classifying the parameter into different levels based on different value ranges. Different values of the parameter may fall within different value ranges, and values falling within different value ranges mean that the values belong to different ranges (or levels). For a concept of parameter division, refer to the conventional technology. Details are not described herein.

Optionally, each hierarchy interval corresponds to one expression, the expression is used to calculate the maximum modification value of the HDR image, and S130 may be: The image processing apparatus determines, from the plurality of hierarchy intervals, a first hierarchy interval to which the maximum reference value belongs, where the first hierarchy interval corresponds to a first expression; and determines the maximum modification value according to the first expression.

Optionally, the plurality of hierarchy intervals and an expression corresponding to each hierarchy interval may be set in a plurality of manners. This is not limited in this embodiment.

In a possible implementation, when the plurality of hierarchy intervals includes three hierarchy intervals, the maximum modification value maximum_maxrgb1 may be determined according to Formula (9):

$$\text{maximum\_maxrgb1} = \begin{cases} MaxRefDisplay, & MAX > MaxRefDisplay \\ MAX, & MIN \leq MAX \leq MaxRefDisplay \\ MIN, & MAX < MIN \end{cases} \quad (9)$$

MaxRefDisplay represents maximum display luminance of a display device used to display the to-be-processed HDR image, MIN represents a preset hierarchy threshold, and MAX represents the maximum reference value.

Optionally, MaxRefDisplay may be obtained based on metadata carried in the HDR image.

In another possible implementation, when the plurality of hierarchy intervals include two hierarchy intervals, the maximum modification value maximum_maxrgb1 may be determined according to Formula (10):

$$\text{maximum\_maxrgb1} = \begin{cases} \min(\text{maximum\_maxrgb}, f(MAX)), & MAX > A \\ A, & MAX \leq A \end{cases} \quad (10)$$

maximum_maxrgb represents the largest value in the maximum RGB component values of the plurality of pixels, MAX represents the maximum reference value, A represents a preset hierarchy threshold, min( ) represents an operation of obtaining a minimum value, and f( ) represents a non-linear function or a linear function.

For example, the preset hierarchy threshold may be the maximum display luminance of the display device.

It should be noted that Formula (9) and Formula (10) merely show example cases in which the maximum reference value is classified into two hierarchy intervals and three hierarchy intervals, and an example correspondence between each hierarchy and an expression. In this embodiment, the maximum reference value may alternatively be classified into other quantities of hierarchy intervals, and an expression corresponding to each hierarchy interval is set. This is not limited.

In conclusion, the maximum reference value of the HDR image is calculated based on the image information of the to-be-processed HDR image, the maximum modification value of the HDR image is calculated based on a hierarchy interval to which the maximum reference value belongs, and the maximum modification value is used as the largest value in the maximum RGB component values to adjust a dynamic range of the to-be-processed HDR image.

Optionally, the maximum modification value in this embodiment may also be referred to as a maximum luminance modification value.

Optionally, S130 may alternatively be: determining a maximum luminance modification value of the HDR image based on the maximum reference value and a plurality of preset hierarchy intervals, where the hierarchy interval is used to classify the maximum reference value, each of the plurality of hierarchy intervals corresponds to one value range corresponding to the maximum reference value, and the maximum luminance modification value is used to modify the largest value in the maximum RGB component values of the plurality of pixels included in the HDR image.

Optionally, each hierarchy interval corresponds to one expression, the expression is used to calculate the maximum modification value of the HDR image, and S130 may include: The image processing apparatus determines, from the plurality of hierarchy intervals, a first hierarchy interval to which the maximum reference value belongs, where the first hierarchy interval corresponds to a first expression; and determines the maximum luminance modification value according to the first expression.

Optionally, the plurality of hierarchy intervals and an expression corresponding to each hierarchy interval may be set in a plurality of manners. This is not limited in this embodiment.

In a possible implementation, when the plurality of hierarchy intervals include three hierarchy intervals, the maximum modification value maximum_maxrgb1 may be determined according to Formula (11):

$$\text{maximum\_maxrgb1} = \begin{cases} \text{MaxRefDisplay}, & \text{MAX} > \text{MaxRefDisplay} \\ \text{MAX}, & \text{MIN} \leq \text{MAX} \leq \text{MaxRefDisplay} \\ \text{MIN}, & \text{MAX} < \text{MIN} \end{cases} \quad (11)$$

MaxRefDisplay represents maximum display luminance that is of a reference display device and that is applicable before the dynamic range of the HDR image is adjusted, MIN represents a preset hierarchy threshold, and MAX represents the maximum reference value.

Optionally, MaxRefDisplay may be obtained based on metadata carried in the HDR image.

In another possible implementation, when the plurality of hierarchy intervals include two hierarchy intervals, the maximum modification value maximum_maxrgb1 may be determined according to Formula (12):

$$\text{maximum\_maxrgb1} = \begin{cases} \min(\text{maximum\_maxrgb}, f(\text{MAX})), & \text{MAX} > A \\ A, & \text{MAX} \leq A \end{cases} \quad (12)$$

maximum_maxrgb represents the largest value in the maximum RGB component values of the plurality of pixels, MAX represents the maximum reference value, A represents a preset hierarchy threshold, min( ) represents an operation of obtaining a minimum value, and f( ) represents a non-linear function or a linear function.

For example, the preset hierarchy threshold may be the maximum display luminance that is of the reference display device and that is applicable before the dynamic range of the HDR image is adjusted.

It should be noted that Formula (11) and Formula (12) merely show example cases in which the maximum reference value is classified into two hierarchy intervals and three hierarchy intervals, and an example correspondence between each hierarchy and an expression. In this embodiment, the maximum reference value may alternatively be classified into other quantities of hierarchy intervals, and an expression corresponding to each hierarchy interval is set. This is not limited.

In conclusion, the maximum reference value of the HDR image is calculated based on the image information of the to-be-processed HDR image, the maximum luminance modification value of the HDR image is calculated based on a hierarchy interval to which the maximum reference value belongs, and the maximum luminance modification value is used as the largest value in the maximum RGB component values to adjust a dynamic range of the to-be-processed HDR image.

In addition, if the maximum luminance modification value is less than maximum display luminance that is of a current display device and that is applicable after the dynamic range of the HDR image is adjusted, the maximum luminance modification value maximum_maxrgb1 is updated to the maximum display luminance of the current display device.

S140: Adjust the dynamic range of the HDR image based on the maximum modification value.

It should be noted that, for a process of adjusting the dynamic range of the HDR image based on the maximum modification value, reference may be made to the foregoing descriptions in FIG. 4. To avoid repetition, details are not described herein again.

According to the HDR image processing method provided in this embodiment, the maximum reference value is classified, and the maximum modification value of the HDR image is calculated based on the maximum reference value. In this way, classification accuracy for HDR images with different levels of dynamic ranges can be improved. In addition, when the maximum modification value is used to adjust the dynamic range of the HDR image, a display effect of the HDR image can be improved.

Optionally, this embodiment further provides a method for verifying accuracy of the maximum modification value of the HDR image.

It should be noted that the accuracy of the maximum modification value may alternatively be understood as classification accuracy for the HDR image.

Optionally, the method for verifying accuracy of the maximum modification value includes: The image processing apparatus verifies the accuracy of the maximum modification value based on a third percentage, a maximum RGB component value of a third pixel corresponding to the third percentage in the HDR image, a maximum RGB component value of a fourth pixel corresponding to the third percentage in an output image, a fourth percentage, a maximum RGB component value of a fifth pixel corresponding to the fourth percentage in the HDR image, and a maximum RGB component value of a sixth pixel corresponding to the fourth percentage in the output HDR image, where the output image is an image obtained by adjusting the dynamic range of the HDR image.

In a possible implementation, when $P_{K_3} \neq P_{K_4}$ and $P'_{K_3} - P'_{K_4} > T$, the image processing apparatus may determine that the maximum modification value is accurate, where $K_3 - K_4 < M$, M is a preset first threshold, T is a preset second threshold, $0 < T < 2$, $K_3$ represents the third percentage, $P_{K_3}$ represents the maximum RGB component value of the third pixel, $P'_{K_3}$ represents the maximum RGB component value of the fourth pixel, $K_4$ represents the fourth percentage, $P_{K_4}$ represents the maximum RGB component value of the fifth pixel, and $P'_{K_4}$ represents the maximum RGB component value of the sixth pixel.

For example, $K_3 = 100\%$, and $K_4 = 99\%$. For the HDR image before adjustment, $P_{100} \neq P_{99}$, indicating that a pixel corresponding to $K_3$ is not equal to a pixel corresponding to $K_4$. In this case, for an adjusted HDR image, a pixel corresponding to $K_3$ should not be equal to a pixel corresponding to $K_4$ either, that is, $P'_{100} - P'_{99} > T$.

Correspondingly, when $P_{K_3} \neq P_{K_4}$ and $P_{K_3} - P_{K_4} \leq T$, the image processing apparatus may determine that the maximum modification value is inaccurate.

Optionally, the image processing apparatus may modify the maximum modification value according to Formula (13) to obtain a modified maximum modification value maximum_maxrgb1:

$$\text{maximum\_maxrgb1}' = \text{offset} \times P_{K_3} + (1 - \text{offset}) \times P_{K_4} \quad (13)$$

maximum_maxrgb1 represents the maximum modification value, the offset is a preset offset, and $0 < \text{offset} < 1$.

Optionally, S140 may alternatively be: adjusting the dynamic range of the HDR image based on the maximum luminance modification value.

It should be noted that, for a process of adjusting the dynamic range of the HDR image based on the maximum luminance modification value, reference may be made to the foregoing descriptions in FIG. 4. To avoid repetition, details are not described herein again.

According to the HDR image processing method provided in this embodiment, the maximum reference value is classified, and the maximum luminance modification value of the HDR image is calculated based on the maximum reference value. In this way, classification accuracy for HDR images with different levels of dynamic ranges can be improved. In addition, when the maximum luminance modification value is used to adjust the dynamic range of the HDR image, a display effect of the HDR image can be improved.

Optionally, this embodiment further provides a method for verifying accuracy of the maximum luminance modification value of the HDR image.

It should be noted that accuracy of the maximum luminance modification value may alternatively be understood as classification accuracy for the HDR image.

Optionally, the method for verifying accuracy of the maximum luminance modification value may include: The image processing apparatus verifies accuracy of the maximum luminance modification value based on a maximum RGB component value of a third pixel corresponding to a third percentage in the HDR image, a maximum RGB component value of a fourth pixel corresponding to the third percentage in a processed image, a maximum RGB component value of a fifth pixel corresponding to a fourth percentage in the HDR image, and a maximum RGB component value of a sixth pixel corresponding to the fourth percentage in the processed HDR image, where the processed image is an image obtained by adjusting the dynamic range of the HDR image.

In a possible implementation, when $P_{K_3} \neq P_{K_4}$ and $P'_{K_3} - P'_{K_4} > T$, the image processing apparatus determines that the maximum luminance modification value is accurate, where $K_3 - K_4 < M$, M is a preset first threshold, T is a preset second threshold, $0 < T < 2$, $K_3$ represents the third percentage, $P_{K_3}$ represents the maximum RGB component value of the third pixel, $P'_{K_3}$ represents the maximum RGB component value of the fourth pixel, $K_4$ represents the fourth percentage, $P_{K_4}$ represents the maximum RGB component value of the fifth pixel, and $P'_{K_4}$ represents the maximum RGB component value of the sixth pixel.

For example, $K_3 = 100\%$, and $K_4 = 99\%$. For the HDR image before adjustment, $P_{100} \neq P_{99}$, indicating that a pixel corresponding to $K_3$ is not equal to a pixel corresponding to $K_4$. In this case, for an adjusted HDR image, a pixel corresponding to $K_3$ should not be equal to a pixel corresponding to $K_4$ either, that is, $P'_{100} - P'_{99} > T$.

Correspondingly, when $P_{K_3} \neq P_{K_4}$ and $P'_{K_3} - P'_{K_4} \leq T$, the image processing apparatus may determine that the maximum luminance modification value is inaccurate.

Optionally, the image processing apparatus may modify the maximum luminance modification value according to Formula (14) to obtain a modified maximum luminance modification value maximum_maxrgb1':

$$\text{maximum\_maxrgb1}' = \text{offset} \times P_{K_3} + (1 - \text{offset}) \times P_{K_4} \quad (14)$$

maximum_maxrgb1' represents the modified maximum luminance modification value, the offset is a preset offset, and $0 < \text{offset} < 1$.

The foregoing describes the HDR image processing method provided in the embodiments with reference to FIG. 1 to FIG. 6. The following describes an image processing apparatus and an image processing device provided in the embodiments with reference to FIG. 7 and FIG. 8.

Figure 7:
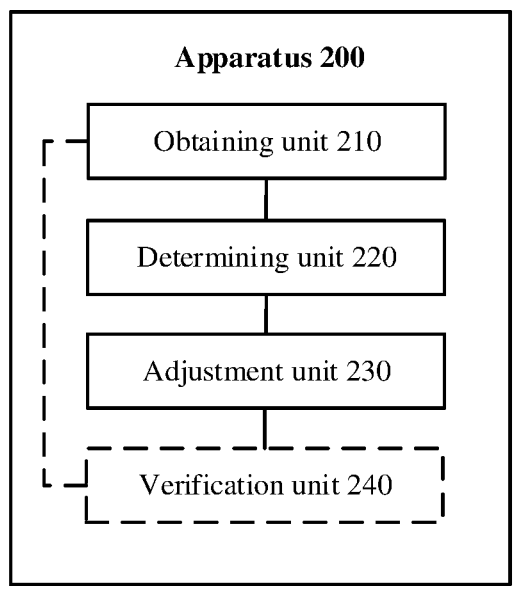
FIG. 7 is a schematic diagram of an image processing apparatus according to an embodiment.

FIG. 7 is a schematic block diagram of an HDR image processing apparatus 200 according to an embodiment. The apparatus 200 includes an obtaining unit 210, a determining unit 220, and an adjustment unit 230.

The obtaining unit 210 is configured to obtain image information of a to-be-processed HDR image, where the HDR image includes a plurality of pixels, the image information includes a first percentage, a maximum RGB component value of a first pixel corresponding to the first percentage, a second percentage, and a maximum RGB component value of a second pixel corresponding to the second percentage, the first percentage indicates a percentage of at least one pixel with a maximum RGB component value less than or equal to the maximum RGB component value of the first pixel in the plurality of pixels to the plurality of pixels, the second percentage indicates a percentage of at least one pixel with a maximum RGB component value less than or equal to the maximum RGB component value of the second pixel in the plurality of pixels to the plurality of pixels, the maximum RGB component value indicates a largest value in an R component value, a G component value, and a B component value of a pixel, and both the first percentage and the second percentage are greater than 0 and less than 1.

In other words, the obtaining unit 210 may be configured to obtain image information of a to-be-processed HDR image, where the HDR image includes a plurality of pixels, the image information includes a maximum RGB component value of a first pixel corresponding to a first percentage and a maximum RGB component value of a second pixel corresponding to a second percentage, the first percentage indicates a percentage of at least one pixel with a maximum RGB component value less than or equal to the maximum RGB component value of the first pixel in the plurality of pixels to the plurality of pixels, the second percentage indicates a percentage of at least one pixel with a maximum RGB component value less than or equal to the maximum RGB component value of the second pixel in the plurality of pixels to the plurality of pixels, the maximum RGB component value indicates a largest value in an R component value, a G component value, and a B component value of a pixel, and both the first percentage and the second percentage are greater than 0 and less than 1.

The determining unit 220 is configured to: determine a maximum reference value of the HDR image based on the first percentage, the maximum RGB component value of the first pixel corresponding to the first percentage, the second percentage, and the maximum RGB component value of the second pixel corresponding to the second percentage; and determine a maximum modification value of the HDR image based on the maximum reference value and a plurality of preset hierarchy intervals, where the hierarchy interval is used to classify the maximum reference value, each of the plurality of hierarchy intervals corresponds to one value range corresponding to the maximum reference value, and the maximum luminance modification value is used to modify a largest value in maximum RGB component values of the plurality of pixels included in the HDR image.

In other words, the determining unit 220 may be configured to: determine a maximum reference value of the HDR image based on the maximum RGB component value of the first pixel corresponding to the first percentage and the maximum RGB component value of the second pixel corresponding to the second percentage; and determine a maximum luminance modification value of the HDR image based on the maximum reference value and a plurality of preset hierarchy intervals, where the hierarchy interval is used to classify the maximum reference value, each of the plurality of hierarchy intervals corresponds to one value range corresponding to the maximum reference value, and the maximum luminance modification value is used to modify a largest value in maximum RGB component values of the plurality of pixels included in the HDR image.

The adjustment unit 230 is configured to adjust a dynamic range of the HDR image based on the maximum modification value of the HDR image.

In other words, the adjustment unit 230 may be configured to adjust a dynamic range of the HDR image based on the maximum luminance modification value.

In a possible implementation, the image information further includes an average value of the maximum RGB component values of the plurality of pixels, and the determining unit 220 is configured to determine the maximum reference value based on the first percentage, the maximum RGB component value of the first pixel, the second percentage, the maximum RGB component value of the second pixel, the largest value in the maximum RGB component values of the plurality of pixels, and the average value of the maximum RGB component values of the plurality of pixels.

In a possible implementation, the determining unit 220 is configured to determine the maximum reference value MAX according to Formula (6).

In a possible implementation, the determining unit 220 is configured to determine the maximum reference value MAX according to Formula (5).

In a possible implementation, each hierarchy interval corresponds to one expression, the expression is used to calculate the maximum modification value of the HDR image, and the determining unit 220 is configured to: determine, from the plurality of hierarchy intervals, a first hierarchy interval to which the maximum reference value belongs, where the first hierarchy interval corresponds to a first expression; and determine the maximum modification value according to the first expression.

In a possible implementation, the determining unit 220 is configured to determine the maximum modification value maximum_maxrgb1 of the HDR image according to Formula (9).

In a possible implementation, the apparatus further includes a verification unit 240, and the verification unit 240 is configured to verify accuracy of the maximum modification value based on a third percentage, a maximum RGB component value of a third pixel corresponding to the third percentage in the HDR image, a maximum RGB component value of a fourth pixel corresponding to the third percentage in an output image, a fourth percentage, a maximum RGB component value of a fifth pixel corresponding to the fourth percentage in the HDR image, and a maximum RGB component value of a sixth pixel corresponding to the fourth percentage in the output HDR image, where the output image is an image obtained by adjusting the dynamic range of the HDR image.

In a possible implementation, the verification unit 240 is configured to: when $P_{K_3} \neq P_{K_4}$ and $P'_{K_3} - P'_{K_4} > T$, determine that the maximum modification value is accurate, where $K_3 - K_4 < M$, M is a preset first threshold, T is a preset second threshold, $0 < T < 2$, $K_3$ represents the third percentage, $P_{K_3}$ represents the maximum RGB component value of the third pixel, $P'_{K_3}$ represents the maximum RGB component value of the fourth pixel, $K_4$ represents the fourth percentage, $P_{K_4}$ represents the maximum RGB component value of the fifth pixel, and $P'_{K_4}$ represents the maximum RGB component value of the sixth pixel.

In a possible implementation, the determining unit 220 is configured to: determine a difference between the maximum RGB component value of the first pixel corresponding to the first percentage and the maximum RGB component value of the second pixel corresponding to the second percentage as a luminance variance range of the HDR image; and determine the maximum reference value based on the luminance variance range.

In a possible implementation, the determining unit 220 is configured to determine the luminance variance range variance_maxrgb according to Formula (7).

In a possible implementation, the image information further includes the largest value in the maximum RGB component values of the plurality of pixels and an average value of the maximum RGB component values of the plurality of pixels, and the determining unit 220 is configured to determine the maximum reference value based on the luminance variance range, the largest value in the maximum RGB component values of the plurality of pixels, and the average value of the maximum RGB component values of the plurality of pixels.

In a possible implementation, the determining unit 220 is configured to determine the maximum reference value MAX according to Formula (8).

In a possible implementation, each hierarchy interval corresponds to one expression, the expression is used to calculate the maximum luminance modification value, and the determining unit 220 is configured to: determine, from the plurality of hierarchy intervals, a first hierarchy interval to which the maximum reference value belongs, where the first hierarchy interval corresponds to a first expression; and determine the maximum luminance modification value according to the first expression.

In a possible implementation, the determining unit 220 is configured to determine the maximum luminance modification value maximum_maxrgb1 according to Formula (11).

In a possible implementation, the determining unit 220 is further configured to: if the maximum luminance modification value is less than maximum display luminance that is of a current display device and that is applicable after the dynamic range of the HDR image is adjusted, update the maximum luminance modification value maximum_maxrgb1 to the maximum display luminance of the current display device.

In a possible implementation, the apparatus further includes a verification unit 240, and the verification unit 240 is configured to verify accuracy of the maximum luminance modification value based on a maximum RGB component value of a third pixel corresponding to a third percentage in the HDR image, a maximum RGB component value of a fourth pixel corresponding to the third percentage in a processed image, a maximum RGB component value of a fifth pixel corresponding to a fourth percentage in the HDR image, and a maximum RGB component value of a sixth pixel corresponding to the fourth percentage in the processed HDR image, where the processed image is an image obtained by adjusting the dynamic range of the HDR image.

In a possible implementation, the verification unit 240 is configured to: when $P_{K_3} \neq P_{K_4}$ and $P'_{K_3} - P'_{K_4} > T$, determine that the maximum luminance modification value is accurate, where $K_3 - K_4 < M$, M is a preset first threshold, T is a preset second threshold, $0 < T < 2$, $K_3$ represents the third percentage, $P_{K_3}$ represents the maximum RGB component value of the third pixel, $P'_{K_3}$ represents the maximum RGB component value of the fourth pixel, $K_4$ represents the fourth percentage, $P_{K_4}$ represents the maximum RGB component value of the fifth pixel, and $P'_{K_4}$ represents the maximum RGB component value of the sixth pixel.

It should be understood that the apparatus 200 herein is embodied in a form of functional units. The term "unit" herein may be an ASIC, an electronic circuit, a processor (for example, a shared processor, a dedicated processor, or a processor group) configured to execute one or more software or firmware programs, a memory, a combined logic circuit, and/or another appropriate component supporting the described functions. In an optional example, a person skilled in the art may understand that the apparatus 200 may be the image processing apparatus in the foregoing embodiment of the method 100, and the apparatus 200 may be configured to perform processes and/or steps corresponding to the image processing apparatus in the foregoing embodiment of the method 100. To avoid repetition, details are not described herein again.

Figure 8:
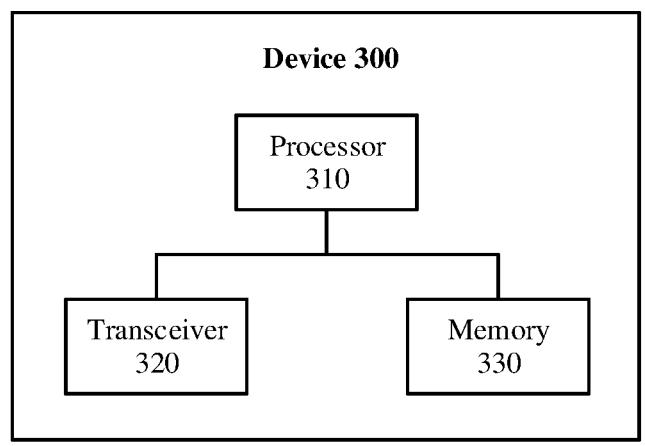
FIG. 8 is a schematic diagram of an image processing device according to an embodiment.

FIG. 8 shows an image processing device 300 according to an embodiment. The device 300 may include the apparatus 200 in FIG. 7, or the device 300 may be the apparatus 200 in FIG. 7. The apparatus 200 may use a hardware architecture shown in FIG. 8. The device 300 may include a processor 310, a transceiver 320, and a memory 330. The processor 310, the transceiver 320, and the memory 330 communicate with each other through an internal connection path. Related functions implemented by the determining unit 220, the adjustment unit 230, and the verification unit 240 in FIG. 7 may be implemented by the processor 310, and a related function implemented by the obtaining unit 210 in FIG. 7 may be implemented by the transceiver 320 under control of the processor 310.

The processor 310 may include one or more processors, for example, include one or more central processing units (CPU). When the processor is one CPU, the CPU may be a single-core CPU or a multi-core CPU.

The transceiver 320 is configured to send data and/or information and receive data and/or information. The transceiver may include a transmitter and a receiver. The transmitter is configured to send data and/or a signal, and the receiver is configured to receive data and/or a signal.

The memory 330 includes but is not limited to a random access memory (RAM), a read-only memory (ROM), an erasable programmable memory (EPROM), and a compact disc read-only memory (CD-ROM). The memory 330 is configured to store related instructions and data.

The memory 330 is configured to store program code and data of the apparatus and may be an independent device or may be integrated into the processor 310.

The processor 310 is configured to control the transceiver to communicate with an apparatus or a device that generates or sends an HDR image. For details, refer to the descriptions in the foregoing method embodiment. Details are not described herein again.

It may be understood that FIG. 8 merely shows an embodiment of the device 300.

During actual application, the device 300 may further include other necessary elements, including but not limited to any quantity of transceivers, processors, controllers, memories, and the like, and all devices that can implement this shall fall within the scope of the embodiments.

The device 300 may be replaced with a chip apparatus, for example, may be a communications chip that may be used in the device, and is configured to implement related functions of the processor in the device. The chip apparatus may be a field programmable gate array, a dedicated integrated chip, a system chip, a central processing unit, a network processor, a digital signal processing circuit, a microcontroller, a programmable controller, or another integrated chip for implementing related functions. Optionally, the chip may include one or more memories, configured to store program code. When the code is executed, the processor is enabled to implement a corresponding function.

It should be understood that sequence numbers of the foregoing processes do not mean execution sequences in the various embodiments. The execution sequences of the processes should be determined according to functions and internal logic of the processes and should not be construed as any limitation on the implementation processes of the embodiments.

A person of ordinary skill in the art may be aware that, in combination with the units and algorithm steps in the examples described in the embodiments can be implemented by electronic hardware or a combination of computer software and electronic hardware. Whether the functions are performed by hardware or software depends on particular applications and design constraint conditions of the solutions. A person skilled in the art may use different methods to implement the described functions for each particular application, but it should not be considered that the implementation goes beyond the scope of the embodiments.

It may be clearly understood by a person skilled in the art that, for the purpose of convenient and brief description, for a detailed working process of the foregoing system, apparatus, and unit, reference may be made to a corresponding process in the foregoing method embodiment. Details are not described herein again.

In several embodiments, it should be understood that the system, apparatus, and method may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in the embodiments may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, some of the solutions may be implemented in a form of a software product. The computer software product is stored in a storage medium and includes several instructions for instructing a computer device (which may be a personal computer, a server, or a network device) to perform all or some of the steps of the method described in the embodiments. The foregoing storage medium includes any medium that can store program code, such as a USB flash drive, a removable hard disk, a read-only memory, a random access memory, a magnetic disk, or an optical disc.

The foregoing descriptions are merely implementations, but are not intended to limit the scope of the embodiments. Any variation or replacement readily figured out by a person skilled in the art shall fall within the scope of the embodiments.

What is claimed is:

1. A high dynamic range image processing method comprising:
obtaining image information of a to-be-processed high dynamic range (HDR) image, wherein the HDR image comprises a plurality of pixels, the image information comprises a maximum RGB component value of a first pixel corresponding to a first percentage and a maximum RGB component value of a second pixel corresponding to a second percentage, the first percentage indicates a percentage of at least one pixel with a maximum RGB component value less than or equal to the maximum RGB component value of the first pixel in the plurality of pixels to the plurality of pixels, the second percentage indicates a percentage of at least one pixel with a maximum RGB component value less than or equal to the maximum RGB component value of the second pixel in the plurality of pixels to the plurality of pixels, the maximum RGB component value indicates a largest value in an R component value, a G component value, and a B component value of a pixel, and both the first percentage and the second percentage are greater than 0 and less than 1;
determining a maximum reference value of the HDR image based on the maximum RGB component value of the first pixel corresponding to the first percentage and the maximum RGB component value of the second pixel corresponding to the second percentage;
determining a maximum luminance modification value of the HDR image based on the maximum reference value and a plurality of preset hierarchy intervals, wherein the hierarchy interval is used to classify the maximum reference value, each of the plurality of hierarchy intervals corresponds to one value range corresponding to the maximum reference value, and the maximum luminance modification value is used to modify a largest value in maximum RGB component values of the plurality of pixels comprised in the HDR image; and
adjusting a dynamic range of the HDR image based on the maximum luminance modification value.

2. The high dynamic range image processing method according to claim 1, wherein the first percentage is greater than the second percentage, and determining the maximum reference value of the HDR image based on the maximum RGB component value of the first pixel corresponding to the first percentage and the maximum RGB component value of the second pixel corresponding to the second percentage further comprises:
determining a difference between the maximum RGB component value of the first pixel corresponding to the first percentage and the maximum RGB component value of the second pixel corresponding to the second percentage as a luminance variance range of the HDR image; and
determining the maximum reference value based on the luminance variance range.

3. The high dynamic range image processing method according to claim 2, wherein the luminance variance range variance_maxrgb is determined according to the following formula:

$$\text{variance\_maxrgb} = P_{K_1} - P_{K_2},$$

wherein
$K_1$ represents the first percentage, $P_{K_1}$ represents the maximum RGB component value of the first pixel, $K_2$ represents the second percentage, $P_{K_2}$ represents the maximum RGB component value of the second pixel, $K_1$ and $K_2$ are preset values, $K_1 - K_2 \geq 0.5$, $0 < K_1 < 1$, and $0 < K_2 < 1$.

4. The high dynamic range image processing method according to claim 2, wherein the image information further comprises the largest value in the maximum RGB component values of the plurality of pixels and an average value of the maximum RGB component values of the plurality of pixels, and determining the maximum reference value based on the luminance variance range further comprises:
determining the maximum reference value based on the luminance variance range, the largest value in the maximum RGB component values of the plurality of pixels, and the average value of the maximum RGB component values of the plurality of pixels.

5. The high dynamic range image processing method according to claim 4, wherein the maximum reference value MAX is determined according to the following formula:

$$\text{MAX} = B \times \text{maximum\_maxrgb} + A \times (2 \times \text{average\_maxrgb}) + (1 - A - B) \times \text{variance\_maxrgb}.$$

wherein $$A = (1 - B) \times \left(1 - F\left(\frac{\text{average\_maxrgb}}{\text{maximum\_maxrgb}}\right)\right),$$

maximum_maxrgb represents the largest value in the maximum RGB component values of the plurality of pixels, average_maxrgb represents the average value of the maximum RGB component values of the plurality of pixels, variance_maxrgb represents the luminance variance range, F( ) represents a preset function, and B is a preset value.

6. The high dynamic range image processing method according to claim 1, wherein the maximum reference value MAX is determined according to the following formula:

$$\text{MAX} = A \times P_{K_1} + (1 - A) \times P_{K_2},$$

wherein
$K_1$ represents the first percentage, $P_{K_1}$ represents the maximum RGB component value of the first pixel, $K_2$ represents the second percentage, $P_{K_2}$ represents the maximum RGB component value of the second pixel, A, $K_1$, and $K_2$ are preset values, $0 < A < 1$, $0 < K_1 < 1$, and $0 < K_2 < 1$.

7. The high dynamic range image processing method according to claim 1, wherein each hierarchy interval corresponds to one expression, the expression is used to calculate the maximum luminance modification value, and the determining a maximum luminance modification value of the HDR image based on the maximum reference value and a plurality of preset hierarchy intervals comprises:

determining, from the plurality of hierarchy intervals, a first hierarchy interval to which the maximum reference value belongs, wherein the first hierarchy interval corresponds to a first expression; and determining the maximum luminance modification value according to the first expression.

8. The high dynamic range image processing method according to claim 1, wherein the maximum luminance modification value maximum_maxrgb1 of the HDR image is determined according to the following formula:

$$\text{maximum\_maxrgb1} = \begin{cases} MaxRefDisplay, & MAX > MaxRefDisplay \\ MAX, & MIN \le MAX \le MaxRefDisplay \\ MIN, & MAX < MIN \end{cases},$$

wherein

MaxRefDisplay represents maximum display luminance that is of a reference display device and that is applicable before the dynamic range of the HDR image is adjusted, MIN represents a preset hierarchy threshold, and MAX represents the maximum reference value.

9. The high dynamic range image processing method according to claim 8, further comprising:

when the maximum luminance modification value is less than maximum display luminance that is of a current display device and that is applicable after the dynamic range of the HDR image is adjusted, updating the maximum luminance modification value maximum_maxrgb1 to the maximum display luminance of the current display device.

10. The high dynamic range image processing method according to claim 1, further comprising:

verifying accuracy of the maximum luminance modification value based on a maximum RGB component value of a third pixel corresponding to a third percentage in the HDR image, a maximum RGB component value of a fourth pixel corresponding to the third percentage in a processed image, a maximum RGB component value of a fifth pixel corresponding to a fourth percentage in the HDR image, and a maximum RGB component value of a sixth pixel corresponding to the fourth percentage in the processed HDR image, wherein the processed image is an image obtained by adjusting the dynamic range of the HDR image.

11. The high dynamic range image processing method according to claim 10, wherein verifying the accuracy of the maximum luminance modification value based on the maximum RGB component value of a third pixel corresponding to the third percentage in the HDR image, the maximum RGB component value of the fourth pixel corresponding to the third percentage inn the processed image, the maximum RGB component value of the fifth pixel corresponding to the fourth percentage in the HDR image, and the maximum RGB component value of the sixth pixel corresponding to the fourth percentage in the processed HDR image further comprises:

when $P_{K_3} \ne P_{K_4}$ and $P_{K_3}' - P_{K_4}' > T$, determining that the maximum luminance modification value is accurate, wherein $K_3 - K_4 < M$, M is a preset first threshold, T is a preset second threshold, $0 < T < 2$, $K_3$ represents the third percentage, $P_{K_3}$ represents the maximum RGB component value of the third pixel, $P_{K_3}'$ represents the maximum RGB component value of the fourth pixel, $K_4$ represents the fourth percentage, $P_{K_4}$ represents the maximum RGB component value of the fifth pixel, and $P_{K_4}'$ represents the maximum RGB component value of the sixth pixel.

12. A high dynamic range image processing apparatus, comprising:

an obtaining unit, configured to obtain image information of a to-be-processed high dynamic range HDR image, wherein the HDR image comprises a plurality of pixels, the image information comprises a maximum RGB component value of a first pixel corresponding to a first percentage and a maximum RGB component value of a second pixel corresponding to a second percentage, the first percentage indicates a percentage of at least one pixel with a maximum RGB component value less than or equal to the maximum RGB component value of the first pixel in the plurality of pixels to the plurality of pixels, the second percentage indicates a percentage of at least one pixel with a maximum RGB component value less than or equal to the maximum RGB component value of the second pixel in the plurality of pixels to the plurality of pixels, the maximum RGB component value indicates a largest value in an R component value, a G component value, and a B component value of a pixel, and both the first percentage and the second percentage are greater than 0 and less than 1;

a determining unit, configured to: determine a maximum reference value of the HDR image based on the maximum RGB component value of the first pixel corresponding to the first percentage and the maximum RGB component value of the second pixel corresponding to the second percentage; and determine a maximum luminance modification value of the HDR image based on the maximum reference value and a plurality of preset hierarchy intervals, wherein the hierarchy interval is used to classify the maximum reference value, each of the plurality of hierarchy intervals corresponds to one value range corresponding to the maximum reference value, and the maximum luminance modification value is used to modify a largest value in maximum RGB component values of the plurality of pixels comprised in the HDR image; and an adjustment unit, configured to adjust a dynamic range of the HDR image based on the maximum luminance modification value.

13. The high dynamic range image processing apparatus according to claim 12, wherein the determining unit is further configured to:

determine a difference between the maximum RGB component value of the first pixel corresponding to the first percentage and the maximum RGB component value of the second pixel corresponding to the second percentage as a luminance variance range of the HDR image; and determine the maximum reference value based on the luminance variance range.

14. The high dynamic range image processing apparatus according to claim 13, wherein the determining unit is further configured to determine the luminance variance range variance_maxrgb according to the following formula:

$$\text{variance\_maxrgb} = P_{K_1} - P_{K_2},$$

wherein
$K_1$ represents the first percentage, $P_{K_1}$ represents the maximum RGB component value of the first pixel, $K_2$ represents the second percentage, $P_{K_2}$ represents the maximum RGB component value of the second pixel, $K_1$ and $K_2$ are preset values, $K_1-K_2 \geq 0.5$, $0 < K_1 < 1$, and $0 < K_2 < 1$.

15. The high dynamic range image processing apparatus according to claim 14, wherein the image information further comprises the largest value in the maximum RGB component values of the plurality of pixels and an average value of the maximum RGB component values of the plurality of pixels, and the determining unit is further configured to:
determine the maximum reference value based on the luminance variance range, the largest value in the maximum RGB component values of the plurality of pixels, and the average value of the maximum RGB component values of the plurality of pixels.

16. The high dynamic range image processing apparatus according to claim 15, wherein the determining unit is further configured to determine the maximum reference value MAX according to the following formula:

$$\text{MAX} = B \times \text{maximum\_maxrgb} +$$
$$A \times (2 \times \text{average\_maxrgb}) + (1 - A - B) \times \text{variance\_maxrgb},$$

wherein $$A = (1 - B) \times \left(1 - F\left(\frac{\text{average\_maxrgb}}{\text{maximum\_maxrgb}}\right)\right),$$

maximum_maxrgb represents the largest value in the maximum RGB component values of the plurality of pixels, average_maxrgb represents the average value of the maximum RGB component values of the plurality of pixels, variance_maxrgb represents the luminance variance range, F( ) represents a preset function, and B is a preset value.

17. The high dynamic range image processing apparatus according to claim 12, wherein the determining unit is further configured to determine the maximum reference value MAX according to the following formula:

$$\text{MAX} = A \times P_{K_1} + (1 - A) \times P_{K_2},$$

wherein
$K_1$ represents the first percentage, $P_{K_1}$ represents the maximum RGB component value of the first pixel, $K_2$ represents the second percentage, $P_{K_2}$ represents the maximum RGB component value of the second pixel, A, $K_1$, and $K_2$ are preset values, $0 < A < 1$, $0 < K_1 < 1$, and $0 < K_2 < 1$.

18. The high dynamic range image processing apparatus according to claim 12, wherein each hierarchy interval corresponds to one expression, the expression is used to calculate the maximum luminance modification value, and the determining unit is further configured to:
determine, from the plurality of hierarchy intervals, a first hierarchy interval to which the maximum reference value belongs, wherein the first hierarchy interval corresponds to a first expression; and
determine the maximum luminance modification value according to the first expression.

19. The high dynamic range image processing apparatus according to claim 12, wherein the determining unit is further configured to determine the maximum luminance modification value maximum_maxrgb1 according to the following formula:

$$\text{maximum\_maxrgb1} = \begin{cases} \text{MaxRefDisplay}, & \text{MAX} > \text{MaxRefDisplay} \\ \text{MAX}, & \text{MIN} \leq \text{MAX} \leq \text{MaxRefDisplay} \\ \text{MIN}, & \text{MAX} < \text{MIN} \end{cases},$$

wherein
MaxRefDisplay represents maximum display luminance that is of a reference display device and that is applicable before the dynamic range of the HDR image is adjusted, MIN represents a preset hierarchy threshold, and MAX represents the maximum reference value.

20. The high dynamic range image processing apparatus according to claim 19, wherein the determining unit is further configured to:
when the maximum luminance modification value is less than maximum display luminance that is of a current display device and that is applicable after the dynamic range of the HDR image is adjusted, update the maximum luminance modification value maximum_maxrgb1 to the maximum display luminance of the current display device.

* * * * *